(12) United States Patent
Jenks et al.

(10) Patent No.: US 9,606,764 B2
(45) Date of Patent: Mar. 28, 2017

(54) SYSTEMS, METHODS, AND DEVICES FOR MANIPULATION OF IMAGES ON TILED DISPLAYS

(71) Applicant: Hiperwall, Inc., Irvine, CA (US)

(72) Inventors: Stephen F. Jenks, Irvine, CA (US); Sung-Jin Kim, Irvine, CA (US); Jeff Greenberg, Irvine, CA (US)

(73) Assignee: Hiperwall, Inc., Irvine, CA (US)

( * ) Notice: Subject to any disclaimer, the term of this patent is extended or adjusted under 35 U.S.C. 154(b) by 0 days.

(21) Appl. No.: 14/635,285

(22) Filed: Mar. 2, 2015

(65) Prior Publication Data

US 2016/0034241 A1  Feb. 4, 2016

Related U.S. Application Data

(63) Continuation of application No. 12/819,105, filed on Jun. 18, 2010, now Pat. No. 8,970,448.

(60) Provisional application No. 61/218,378, filed on Jun. 18, 2009.

(51) Int. Cl.
  *G09G 5/00* (2006.01)
  *G06F 3/14* (2006.01)
  *G06T 19/00* (2011.01)

(52) U.S. Cl.
  CPC ............ *G06F 3/1446* (2013.01); *G06T 19/00* (2013.01); *G09G 5/005* (2013.01); *G09G 5/003* (2013.01); *G09G 2300/026* (2013.01); *G09G 2370/04* (2013.01)

(58) Field of Classification Search
  None
  See application file for complete search history.

(56) References Cited

U.S. PATENT DOCUMENTS

| | | |
|---|---|---|
| 5,390,295 A | 2/1995 | Bates et al. |
| 5,523,769 A | 6/1996 | Lauer et al. |
| 5,657,046 A | 8/1997 | Noble et al. |
| 5,923,307 A | 7/1999 | Hogle, IV |
| 6,208,319 B1 | 3/2001 | Nishida |
| 6,232,932 B1 | 5/2001 | Thorner |
| 6,344,836 B1 | 2/2002 | Suzuki |
| 6,573,913 B1 | 6/2003 | Butler et al. |
| 6,611,241 B1 | 8/2003 | Firester |
| 6,614,439 B2 | 9/2003 | Matsumoto et al. |
| 6,738,079 B1 | 5/2004 | Kellerman et al. |
| 7,053,862 B2 | 5/2006 | Zerphy et al. |
| 7,193,583 B2 | 3/2007 | Zerphy et al. |
| 7,683,856 B2 | 3/2010 | Sakai et al. |

(Continued)

*Primary Examiner* — Ryan M Gray
(74) *Attorney, Agent, or Firm* — Knobbe, Martens, Olson & Bear, LLP

(57) ABSTRACT

In accordance with some embodiments of the inventions, a display system is disclosed for manipulation of images on tiled displays. The display system can include at least one discrete display device and a control module configured to allow a user to move a graphical representation of an image to a plurality of positions on the at least one discrete display device to thereby define a requested position. The control module can be configured to determine a difference between the requested position and a plurality of predetermined positions on the at least one discrete display device. The control module can also be configured to move and/or stretch the image toward one of the predetermined positions based on the determination of the determined difference.

14 Claims, 22 Drawing Sheets

(56) References Cited

U.S. PATENT DOCUMENTS

| | | |
|---|---|---|
| 7,686,454 B2 | 3/2010 | Iketani et al. |
| 7,777,691 B1 | 8/2010 | Nimmer et al. |
| 7,778,842 B2 | 8/2010 | Apple et al. |
| 7,880,687 B2 | 2/2011 | Kondo et al. |
| 8,102,333 B2 | 1/2012 | Kondo et al. |
| 8,117,314 B2 | 2/2012 | Croft et al. |
| 8,120,596 B2 | 2/2012 | Popovich et al. |
| 8,356,258 B2 | 1/2013 | Matthews et al. |
| 8,410,993 B2 | 4/2013 | Jenks et al. |
| 8,797,233 B2 | 8/2014 | Jenks et al. |
| 8,970,448 B2 | 3/2015 | Jenks et al. |
| 2001/0006375 A1 | 7/2001 | Tomooka et al. |
| 2003/0020671 A1 | 1/2003 | Santoro et al. |
| 2003/0098820 A1 | 5/2003 | Someya et al. |
| 2004/0066407 A1* | 4/2004 | Regan .................. G06F 3/0481 715/764 |
| 2005/0022135 A1 | 1/2005 | De Waal |
| 2006/0256035 A1 | 11/2006 | Kondo et al. |
| 2008/0228923 A1 | 9/2008 | Chidambaran et al. |
| 2009/0064035 A1* | 3/2009 | Shibata ................ G06F 3/0481 715/803 |
| 2009/0150823 A1* | 6/2009 | Orr ....................... G06F 3/0481 715/788 |
| 2009/0201224 A1 | 8/2009 | Case |
| 2010/0141552 A1* | 6/2010 | Ferlitsch ............... G06F 3/1446 345/1.3 |
| 2012/0139840 A1 | 6/2012 | Day et al. |
| 2014/0098006 A1 | 4/2014 | Jenks et al. |

\* cited by examiner

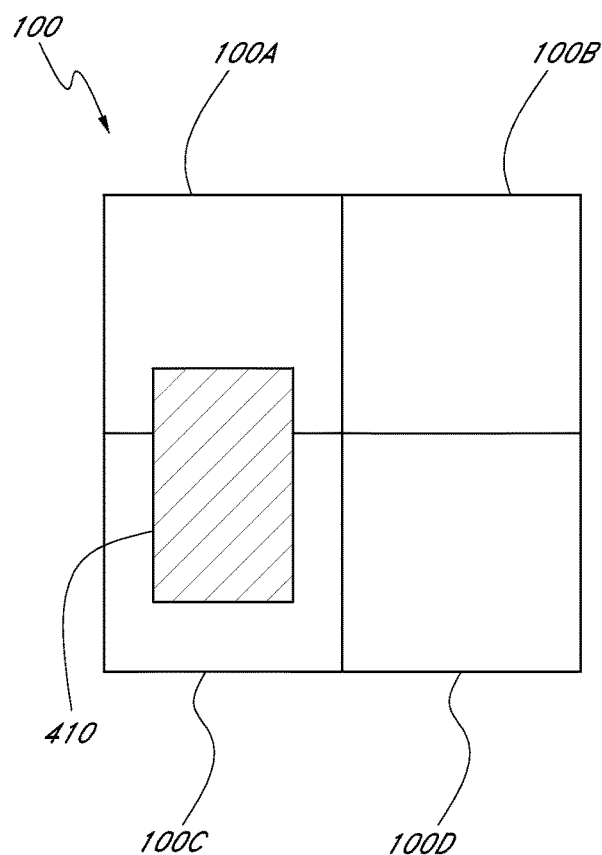
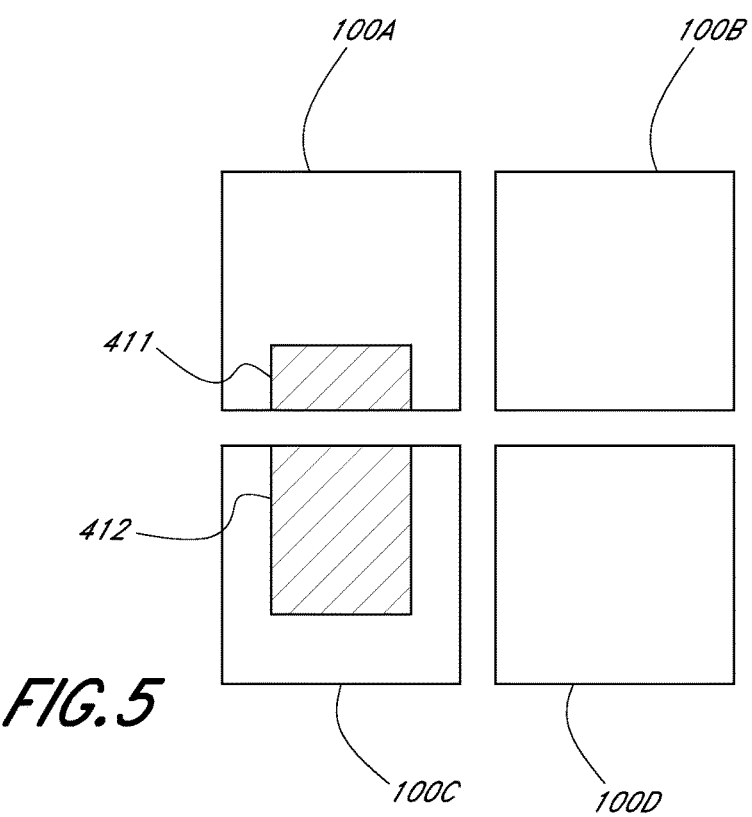
FIG.4
FIG.5

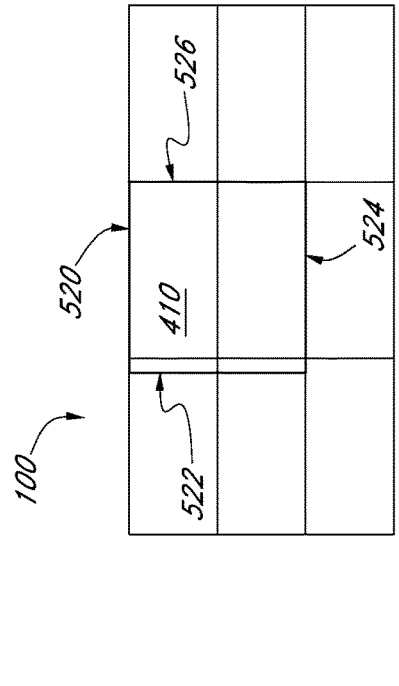
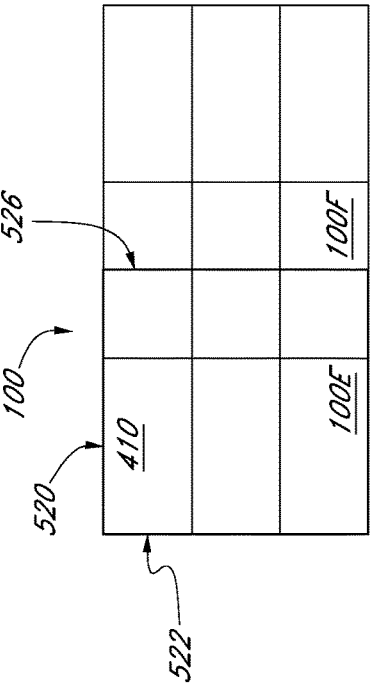
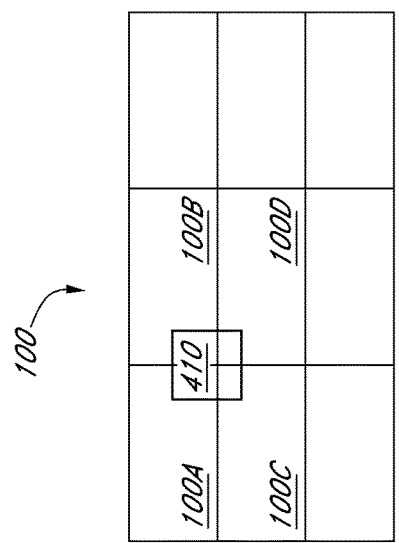
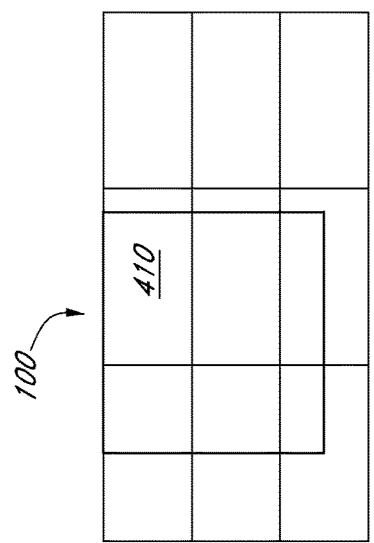

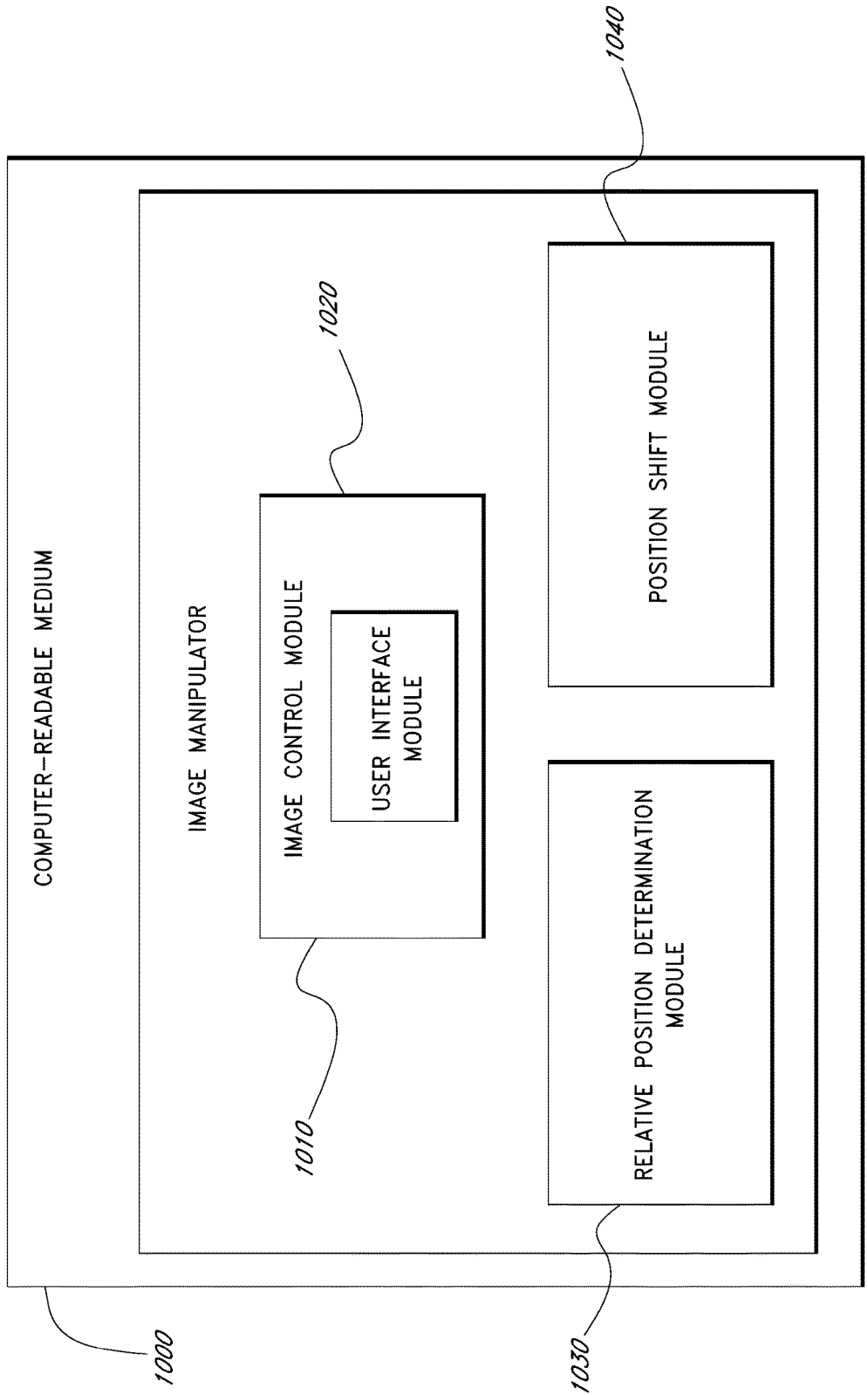

SYSTEMS, METHODS, AND DEVICES FOR MANIPULATION OF IMAGES ON TILED DISPLAYS

BACKGROUND OF THE INVENTIONS

Field of the Inventions

The present inventions relate to systems, methods and devices for manipulating images on displays, and more particularly, to the manipulation of images on a tiled display.

Description of the Related Art

Traditionally, personal computers and workstations are connected to one or a small number of adjacent display devices, often LCD type monitors. Such systems can provide the user with the ability to view a larger number of pixels than that typically displayable on a single monitor.

Commercially available computer systems can often support one or two monitors for each video controller (sometimes constructed in the form of a "video card") connected to the system. For example, typical "PC" computer systems include several "expansion slots" which can accept certain types of video cards. Motherboards of some "PCs" are built with one or more PCI, PCI Express, AGP, etc., slots that can accept video cards. In this manner, a single computer can be provided with multiple video cards to increase the number of displays that can be controlled by the computer.

SUMMARY OF THE INVENTIONS

An aspect of at least one of the inventions disclosed herein includes the realization that the manipulation, including movement, zooming, stretching, etc. of an image on a tiled display can be enhanced by providing for the automated adaptation of an image to physical and/or logical boundaries associated with the display. For example, when a user is attempting to place a plurality of images onto a display so as to allow the user to see all of the images and at the same time effectively utilize the available space on the display, it can be time-consuming for the user to individually place and resize all of the images to fill the display as efficiently as possible. For example, if a user attempts to place eight (8) images on a single display so that they do not overlap and are approximately the same size, a user may be required to individually place each image on a position on the display and stretch or shrink the images so that all eight (8) images fit on a single display.

Thus, in accordance with some embodiments disclosed herein, a system is configured to adjust at least one of the dimensional and positional characteristics of an image on the display so as to conform to at least one logical boundary of a display.

Another aspect of at least some of the embodiments disclosed herein includes the realization that the manipulation of images can be further complicated when attempting to arrange one or more images on a tiled display. A tiled display can include a number of display units, such as monitors or a display formed of a plurality of projection devices in which the entire display is formed of a plurality of individual display units positioned adjacent one another. As such, although the entire display system can operate more or less as a single display unit, the physical boundaries between each of the individual display units can cause some visual distortions.

For example, where a tiled display is made up of a plurality of LCD or plasma screen monitors, the physical boundaries of each display unit, referred to as the "bezel" generates a blank area within the overall display. Similarly, due to imperfections in the alignment, focus, brightness, color balance or other display characteristics, a tiled array formed of a plurality or projection units can also cause visual distortions where the edges of the projected image meet each other.

Thus, in some embodiments, a system for manipulating an image on a tiled array is configured to adapt at least one of the dimensional and positional parameters of an image to conform to at least one of a physical or logical boundary associated with the tiled display.

In some embodiments, a display system includes at least one discrete display device and a control module configured to allow a user to move a graphical representation of an image to a plurality of positions on the at least one discrete display device to thereby define a requested position. The control module can be further configured to determine a difference between the requested position and a plurality of predetermined positions on the at least one discrete display device and to move and/or stretch the image toward one of the predetermined positions based on the determination of the determined difference. In some embodiments, the predetermined positions include fractional portions of the at least one discrete display device.

In accordance with some embodiments, a method of positioning an image on an arrayed display system having a plurality of discrete display devices disposed adjacent one another includes receiving an input from a user defining an initial image position of an image on the array in an orientation overlapping at least two of the discrete display devices, determining a quantitative proximity value representing a proximity of at least a reference portion of the image and a reference portion of at least one of the at least two discrete display devices, and displaying the image in one of a plurality of different predetermined positions which are different than a position corresponding to the initial position, based on the determined quantitative proximity value.

In some embodiments, a computer program stored in a computer readable media and configured to cause a computer to control the display of images on an arrayed display system including a plurality of discrete display devices disposed adjacent one another includes an image control module configured to control the size and location of an image displayed on the arrayed display. The image control module can further include a user interface module configured to allow a user to input an image position request identifying a requested position of an image on the array in an orientation overlapping at least two of the discrete display devices. The computer program can also include a relative position determination module configured to determine a quantitative proximity value representing a proximity of at least a reference portion of the image in a position on the arrayed display system corresponding to the requested position and a reference portion of at least one of the at least two discrete display devices. The computer program can further include a position shift module configured to position the image on the arrayed display away from the requested position of the image toward one of a plurality of predetermined positions based on the quantitative proximity value determined by the relative position determination module.

For purposes of summarizing the disclosure, certain aspects, advantages and novel features of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein.

BRIEF DESCRIPTION OF THE DRAWINGS

The above-mentioned and other features of the inventions disclosed herein are described below with reference to the drawings of preferred embodiments. The illustrated embodiments are intended to illustrate, but not to limit the inventions. The drawings contain the following Figures:

FIG. 4 schematically illustrates an image overlapping two display units in an array display.

FIG. 5 schematically illustrates the image of FIG. 4 partitioned over two display units.

Figures 7, 8, 9, 10:
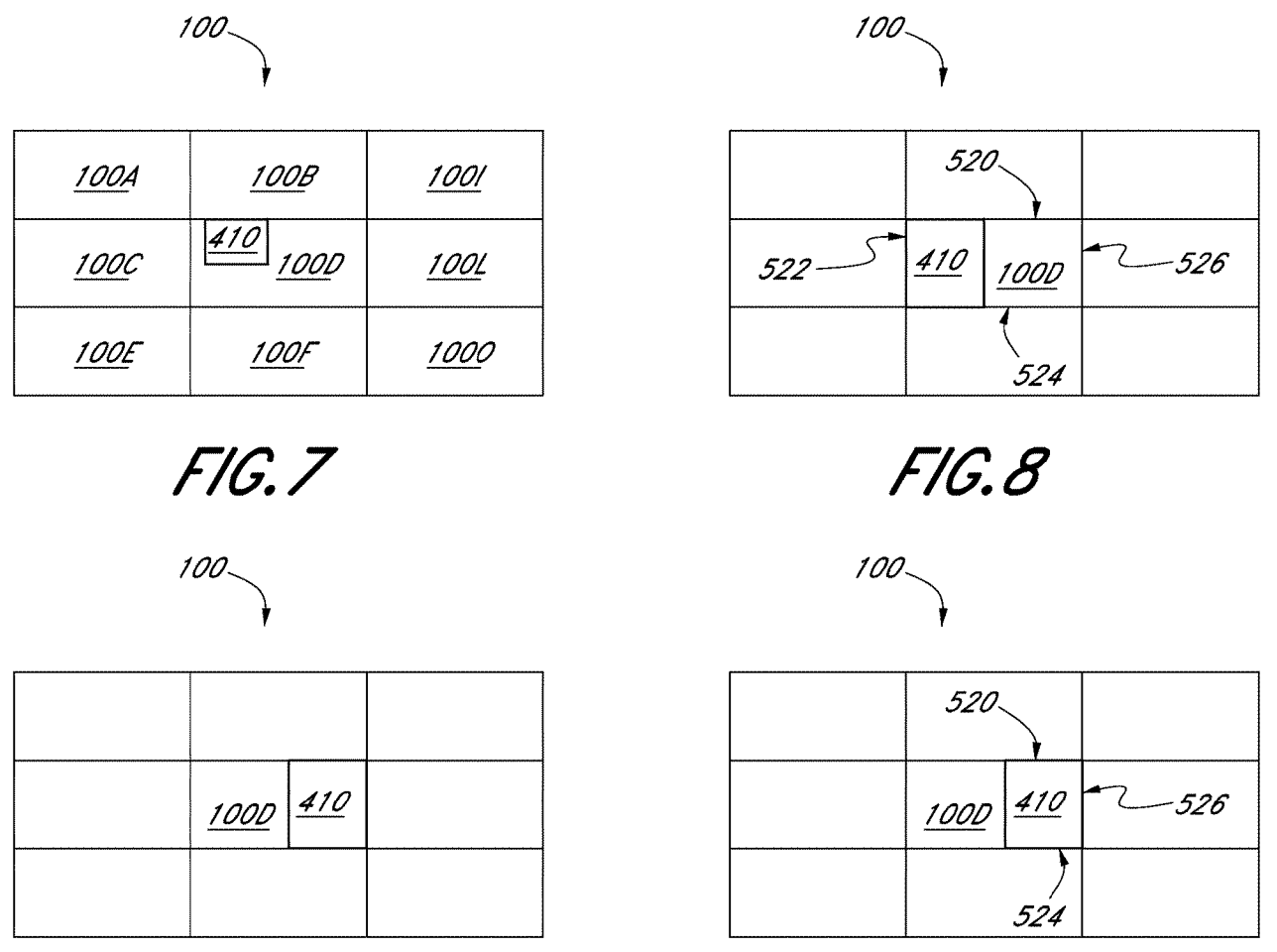

FIG. 7 is a schematic representation of an image displayed on a tiled display, formed of nine (9) display units.

FIG. 8 is a schematic representation of the image of FIG. 7 having been stretched to conform to three (3) boundaries of the tiled display with the original aspect ratio preserved.

FIG. 9 is a schematic representation of an image presented on a tiled display.

FIG. 10 is a schematic representation of the image of FIG. 9 having been moved and stretched to conform to the plurality of boundaries of the tiled display with the original aspect ratio preserved.

FIG. 15 is a schematic representation of an image represented on a tiled display and overlapping four (4) display units of the tiled display.

FIG. 16 is a schematic illustration of the image of FIG. 15 having been moved and stretched to conform to three (3) boundaries of the tiled display, with the original aspect ratio preserved.

FIG. 17 is a schematic illustration of an image represented on a tiled display, overlapping six (6) display units.

FIG. 18 is a schematic illustration of the image of FIG. 17 having been moved and stretched to conform to three (3) boundaries of the tiled display.

FIG. 19 is a schematic illustration of an image overlapping six (6) units of a tiled display.

FIG. 20 is a schematic representation of the image of FIG. 19 having been moved and stretched to conform to three (3) boundaries of the tiled display, with the original aspect ratio preserved.

FIG. 21 is another schematic illustration of an image represented on the tiled display and overlapping six (6) units of the tiled display.

FIG. 22 is a schematic illustration of the image from FIG. 21 having been moved and stretched to conform to three (3) boundaries of the tiled display, with the original aspect ratio preserved.

FIG. 60 is a schematic diagram illustrating modules stored on a computer readable medium that can be used with the system of FIG. 1 to provide snapping functions.

DETAILED DESCRIPTION OF SPECIFIC EMBODIMENTS

Figure 1:
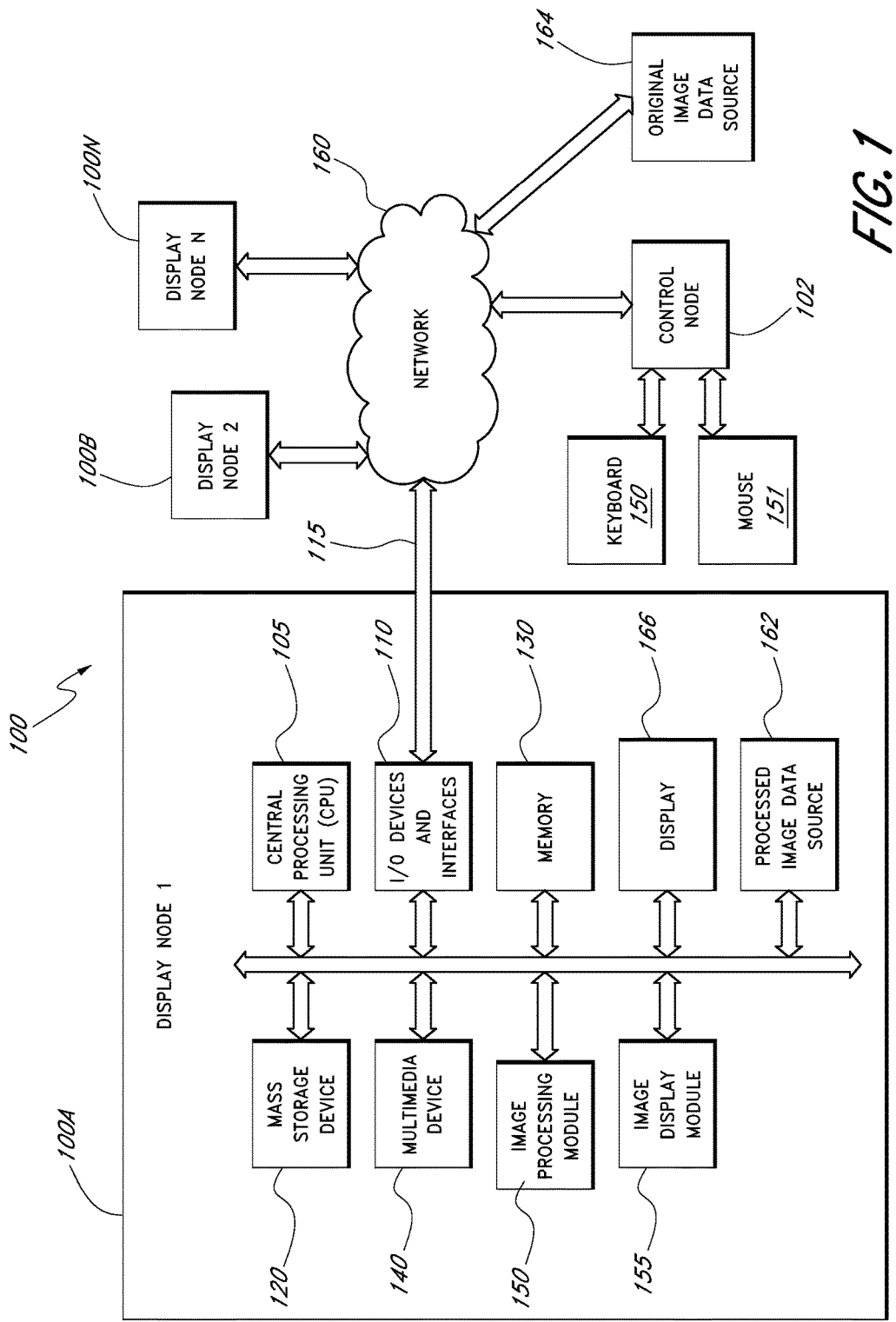
FIG. 1 is a schematic diagram illustrating an embodiment of a system for dynamic management of data streams of image data to a display array.

The present disclosure generally relates to array-type displays and manipulation of an image, a stream of visual data, or the like on an array-type display, such as a tiled display system. In some embodiments, a system that implements a highly interactive large image or parallel display system can be used. In contrast to existing frameworks where unnecessary parts of images are displayed or loaded in the memory of a display node, some embodiments of the present systems can calculate limited portions of images to be displayed on a particular display node. This advantageously reduces the amount of data to be loaded on a particular display node, and thus increases the responsiveness of the overall tiled display. The system can thus allow updating and/or movement of images around the tiled display at a faster rate.

Additionally, some embodiments disclosed herein can allow panning, zooming, rotating, color filtering, transparency controlling, and the like of images and other visual data, including streaming data, video data (e.g., movies), content received using screen sender technology, and/or other active content, on the tiled display, as well as other functions. Some of the embodiments described below can accommodate viewing of multiple highly detailed images, which can exceed billions of pixels, to be displayed as part of a high resolution, coordinated workspace on a tiled display. The in real-time or in near real-time interaction with the multiple image data, which can be received from multiple image data sources, can include moving, zooming, rotating, color filtering, and transparency control of the images more quickly, such as described in U.S. Publication No. 2010/0123732, the entire content of which is incorporated herein by reference. Thus the system can be beneficial for viewing or visualizing various types of data, such as medical, cancer cells, satellite, geosciences, oil monitoring, weather monitoring or prediction, astronomy, and the like.

Embodiments are described below with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the inventions may include several novel features, no single one of which is solely responsible for its desirable attributes or which is essential to practicing the inventions herein described.

Also presented herein are methods, systems, devices, and computer-readable media for systems for dynamic management of data streams updating displays. Additional details regarding systems for dynamic management of data streams updating displays are described in U.S. Publication No. 2010/0045594, the entire content of which is incorporated herein by reference. Some of the embodiments herein generally relate to presenting video image data on a tiled array of display units, thereby allowing the display of much larger images than can be shown on a single display, such as described in U.S. Publication No. 2010/0123732, the entire content of which is incorporated herein by reference. Each such display unit can include a video image display, a communication mechanism, such as a network interface card or wireless interface card, and a video image controller, such as a graphics card. Attached to the tiled display may be one or more computers or other sources of video image data. A workstation may also be coupled to the tiled display and to the user computers. Each of the computers can display data or images on the tiled display simultaneously. Since the tiled display is made up of multiple display units, the images from a single user computer may be on multiple, separate individual display units. The images from multiple user computers could also be shown on the same display unit and can overlap.

In some embodiments, initial connections between the a source of image data and the tiled display can be established through a "local workstation", for example, a computer disposed in front of the tiled array. As such, a user can operate the primary workstation to control the tiled display. In other embodiments, one of the "nodes" of the tiled display can serve as the a controlling node with input devices, such as mice and keyboards, connected thereto for allowing a user to control the placement and manipulation of images on the tiled display.

As described in more detail below, individual display units in the tiled display can subscribe to or connect to the image source, or vice versa, and therefore information can travel directly from the image source to the designated display unit or "node" of the tiled display. This can technique can be used to reduce the amount of bandwidth needed and the amount of computation required for each display unit.

Additionally, in some embodiments, user interaction devices such as a mouse or keyboard coupled to a workstation or another other client device and can be used to manipulate or interact with images that are displayed on the tiled display. This interaction data is sent to the corresponding client for updating its display device as well as the related display units or "nodes" of the tiled display. Such systems and methods can be useful when a user desires to display an image that is larger than a traditional display connected to a user computer can handle.

The systems and methods described herein, along with the associated Figures, illustrate example operating environments of use. As will be described in greater detail below, these systems and methods may be implemented using computing devices other than display devices. To illustrate, in certain embodiments, the systems and methods generally provide functionality for a computing device to broker network communications between two other computing devices. For example, a control computing device could broker a connection between a media server and a destination computing device, which may be a display. Advantageously, in certain embodiments, the destination computing device and the media source device can communicate without passing any or all communication through the control computing device.

FIG. 1 is a block diagram showing of a plurality of display nodes 100A (including display nodes 100A, 100B, and 100N that are representative of any quantity of display nodes) that are in communication with a network 160 and other devices via the network 160, including an optional control node 102, which can also be referred to as a primary workstation in some embodiments. Visual data, such as video image data discussed below, can be stored in any device connected to the network, including the nodes 100N, the control node 102, or any other device. In some embodiments, original image data source 164 can be a mass storage device or computing system, also in communication with the network 160. In some embodiments, the tiled display system 100 comprises a single discrete display device (e.g., a projector or a standalone large display). In other embodiments, the tiled display system 100 comprises an array of discrete display devices or multiple arrayed display walls. In some embodiments, the tiled display system 100 comprises multiple arrayed display walls and one or more standalone display devices (e.g., "satellite" monitors).

Generally, the control node 102 can comprise one or more computing devices that gather or make available information about the state of the overall tiled display system 100, including display nodes 100, through the use of messages. For example, the control node 102 can include a desktop, laptop, tablet, netbook, handheld computing device (e.g., a smartphone or PDA), a server, or the like. In addition, the control node 102 can function as a front end interface to the tiled display system 100 that allows a user to interact with the overall system 100 by manipulating the parallel display, for example.

Any of the display nodes 100N and control node 102 can be used to implement certain systems and methods described herein. For example, in some embodiments, the display node 100A and control node 102 can be configured to manage the display of information on tiled display systems. The functionality provided for in the components and modules of the display node 100A and control node 102 can be combined into fewer components and modules or further separated into additional components and modules.

In some embodiments, the display node 100A can include, for example, a computing device, such as a personal computer that is IBM, Macintosh, or Linux/Unix compatible. In some embodiments, the computing device comprises a server, a laptop computer, a cell phone, a personal digital assistant, a kiosk, or an audio player, for example.

With continued reference to FIG. 1, although only exemplary components of the display node 100A are described in detail, it is to be understood that the descriptions of the display node 100A set forth herein also apply to the other nodes 100B, 100N.

In some embodiments, the display node 100A can include a central processing unit ("CPU") 105, which can include one or more microprocessors, graphics processors, digital signal processors, or the like. The display node 100A can further include a memory 130, such as random access memory ("RAM") for temporary storage of information and a read only memory ("ROM") for permanent storage of information, and a mass storage device 120, such as one or more hard drive, diskette, and/or optical media storage device. Typically, the modules of the display node 100A are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The display node 100A can be controlled and coordinated by operating system software, such as Windows 95, Windows 98, Windows NT, Windows 2000, Windows XP, Windows Vista, Linux, SunOS, Solaris, a real-time operating system (RTOS), or other compatible operating systems. In Macintosh systems, the operating system may be any available operating system, such as MAC OS X. In other embodiments, the display node 100A can be controlled by a proprietary operating system. The operating systems can control and schedule computer processes for execution, perform memory management, provide file system, networking, and I/O services, and provide a user interface, such as a graphical user interface ("GUI"), among other things.

The exemplary display node 100A can include one or more commonly available input/output (I/O) devices and interfaces 110, such as a keyboard, mouse, touchpad, and printer. In addition, display node 100A can include one or more display devices 166, such as a monitor, that allows the visual presentation of data, such as the image data described herein, to a user. More particularly, a display device provides for the presentation of scientific data, GUIs, application software data, and multimedia presentations, for example. The display node 100A can also include one or more multimedia devices 140, such as speakers, video cards, graphics accelerators, and microphones, for example.

In some embodiments, the I/O devices and interfaces 110 can provide a communication interface to various external devices. The display node 100A can be coupled to a network 160 that comprises one or more of a LAN, WAN, or the Internet, for example, via a wired, wireless, or combination of wired and wireless, communication link 115. The network 160 communicates with various computing devices and/or other electronic devices via wired or wireless communication links.

In the embodiment of FIG. 1, display node 100A can include, or may be coupled to via a network connection, to a processed image data source 162, such as a database, that includes information about one or more images to display. The information supplied by the processed image data source 162 can include a full size or original image that was or will be preprocessed and stored in a hierarchical format that includes sub-images, with each sub-image being a reduced size version of the original image. For example, a reduced resolution sub-image can be generated from an original full resolution image by deleting rows and columns of the pixels of the original image at predetermined spacings, thereby generating a lower resolution version of the full image. Any other known technique can also be used. The processed image data source 162 can serve as a video image data source, as used in the description set forth herein.

In some embodiments, the largest sub-image can be the same size as the original image and/or include image content from the original image. For example, each sub-image can be stored as one or more blocks to allow rapid access to a particular part of the original image without having to access entire rows. Of note, this can allow display node 100A to fetch exactly the level of detail (sub-image) it requires and/or to quickly fetch the needed blocks that make up the image tile to be placed on display 166. In addition to the devices that are illustrated in FIG. 1, display node 100A can be connected to original image data source 164 or computing devices through a bus or network 160.

Original image data source 164 can include one or more original or full size images that can be tens or hundreds of millions of pixels, or even billions of pixels. In some embodiments, display node 100A can preprocess the original images stored in original image data source 164, store the result in a hierarchical format in processed image data source 162, calculate the correct portion of original images to be displayed on a particular display node 100, and/or display the corresponding preprocessed image data. Thus, the processed image data source 162 can be used to reduce the amount of data that needs to be loaded in memory and support faster manipulation of images.

Of note, the original images stored in original image data source 164 can be compressed or uncompressed images. In some embodiments, the processed image data source 162 can also be configured to receive a compressed image from the original image data source 164. Once received, display node 100A can decompress an original image and then preprocess the original image into a set of one or more images that are compressed or decompressed and store them in the processed image data source 162. Spatial identifiers can be used to identify various portions of the images to facilitate extraction of different regions of the original image.

In some embodiments, one or more of the data sources may be implemented using a relational database, such as Sybase, Oracle, CodeBase and Microsoft® SQL Server as well as other types of databases such as, for example, a flat file database, an entity-relationship database, an object-oriented database, and/or a record-based database.

With continued reference to FIG. 1, in some embodiments the display node 100A can also include application modules that can be executed by the CPU 105. In some embodiments, the application modules include the image processing module 150 and image display module 155, which are discussed in further detail below. These modules can include, by way of example, hardware and/or software components, such as software components, object-oriented software components, class components and task components, processes, functions, attributes, procedures, subroutines, segments of program code, drivers, firmware, microcode, circuitry, data, databases, data structures, tables, arrays, and variables.

In some of the embodiments described herein, each display node 100A can be configured to execute instructions in the image processing module 150, among others, in order to support user interactivity by reducing the amount of data loaded into memory when an image is to be displayed on the tiled display system. In addition, image processing module 150 can be configured to allow portions of several images to be resident on each display 166, thus supporting display and manipulation of multiple big or original images across multiple display nodes 100. For example, in some embodiments, an original image can be tens of billions of pixels. Image processing module 150 can preprocess and store in a hierarchical format multiple full size or original images by calculating the correct portion of the original images to be displayed on a specific display node 100.

In certain embodiments, each original image can be stored in a hierarchical format that includes sub-images that can be reduced size or reduced resolution versions of the original image. In some embodiments, the largest sub-image can be the same size as the original image and/or include image content from the original image to support zoom in and/or out, for example. Image processing module 150 can then store each sub-image of the original image as one or more blocks to allow rapid access to a particular part of the full size image without having to access entire rows or columns. This can advantageously allow a display node 100A that knows which portion of the original image is needed for its display 166 to fetch the level of detail needed, such as a sub-image and/or to quickly fetch the needed blocks that make up the image tile.

Image processing module 150 can be further configured to send requests to control node 102 for information about other display nodes (e.g., 100B, 100c, etc.) and/or vice versa. In some embodiments, messages can be exchanged between control node 102 and/or other display nodes that include information about the state of the aggregate tiled display, or a particular display node 100A, 100B, 100C, etc. The image processing module 150 and/or the control node 102 may communicate the messages using a web service or using proprietary protocols.

Display node 100A can also execute instructions in image display module 155 to display one or more images or portions thereof and manipulate the images. As noted above, an original image that is full size can be preprocessed by image processing module 150 and then stored in processed image data source 162. Because the amount of data loaded into memory 130 can be reduced when an original image is stored in hierarchical format, image display module 155 can enable a highly interactive display space that spans multiple display nodes 100.

For example, image display module 155 can load the appropriate sub-image of an original image in memory 130 and on display 166. In some embodiments, surrounding blocks and blocks from higher and lower levels can also be pre-fetched for higher performance by image display module 155. This may allow each display node 100A to support the display of more than one such image or portions thereof. Additionally, a resource management approach can support interactivity by reducing the amount of data loaded and allowing portions of several images to be resident on each tile, thus supporting display and manipulation of multiple big images.

Advantageously, image display module 155 can be configured to allow the use of multiple highly detailed image data, which can exceed billions of pixels, to be displayed as part of a high resolution, coordinated workspace on a tiled display that includes multiple display nodes 100. Further, image display module 155 allows in real-time or in near real-time interaction with multiple images by allowing moving, zooming, rotating, color filtering, and transparency controlling of images on display node 100.

For example, in some embodiments, the user may use a front end interface, such as control node 102, and select to rotate an image on the tiled display system. Image display module 155 can respond to the user's selection, by using a reduced size or reduced resolution version of the original image, which may be stored in the processed image data source 162, to quickly adjust its display 166. For example, when the image on the system is initially selected for rotation, the image display module 155 can replace the image being displayed with the reduced size or reduced resolution version during the rotation process. Plus, as the reduced size or reduced resolution version of the original image is rotated and thus redrawn at different angular orientations, less processing power is required to complete the redraw process, thereby providing a quicker response time.

In addition, image display module 155 may also exchange messages with control node 102 or other display nodes 100A about the state of the tiled display, such as which portion of the original image are to be displayed by respective nodes. Thus image display module 155 can provide a highly interactive experience that has numerous applications, including the manipulation of data about medical conditions, cancer cells, satellite images, geosciences, oil monitoring, weather monitoring or prediction, astronomy, video gaming, and the like.

Although FIG. 1 has been described with respect to display nodes 100, a control node 102, and an image data source 164, certain of the features of the system shown in FIG. 1 can be implemented using other types of computing devices communicating over the network 160. For example, the control node 102 can communicate over the network 160 with a media source device (instead of the image data source 164) and one or more destination computing devices (instead of the display nodes 100).

The control node 102 can broker a connection between the media source device and a destination computing device. In one embodiment, the control node 102 locates media data stored on the media source device and obtains the media data or a portion thereof (such as a thumbnail) from the media source device. The control node 102 may then send the media data or the portion thereof to the destination computing device, along with network communication or connectivity data. The network communication data can enable the destination computing device to communicate with the media source device to obtain media data. The network communication data could include, for example, a network address (such as an IP address) of the media source device, a proxy for the media source device, an anycast IP address for a plurality of media source devices, or the like.

Advantageously, in certain embodiments, providing the network communication data from the control node 102 to the destination computing device enables the destination computing device to obtain media, including media updates, from the media source device. As a result, the control node 102 can be less of a bottleneck for communications between the media source device and the destination computing device.

In an embodiment, the destination computing device can report or otherwise provide the media updates it receives or a portion thereof to the control node 102. For example, the destination computing device can provide a thumbnail, a reduced frame rate video, metadata associated with the media updates, combinations of the same, and the like. The control node 102 can therefore keep track of the media data provided to the destination control device.

In another embodiment, the control node 102 can provide network communication information to the media source device instead of or in addition to providing communication information to the destination computing device. This network communication information can allow the media source device to communicate with the destination computing device. For example, the control node 102 can provide a network address of the destination computing device to the media source device. The media source device can then push media to the destination computing device.

In still another embodiment, the control node 102 can identify media stored on the media computing device without requesting the media. The control node 102 can provide network communication data to the destination computing device, which allows the destination computing device to obtain the media from the media server. Thus, little or no media might pass through the control node 102 from the media source device to the destination computing device, further reducing bottleneck effects of the control node 102.

Figure 2:
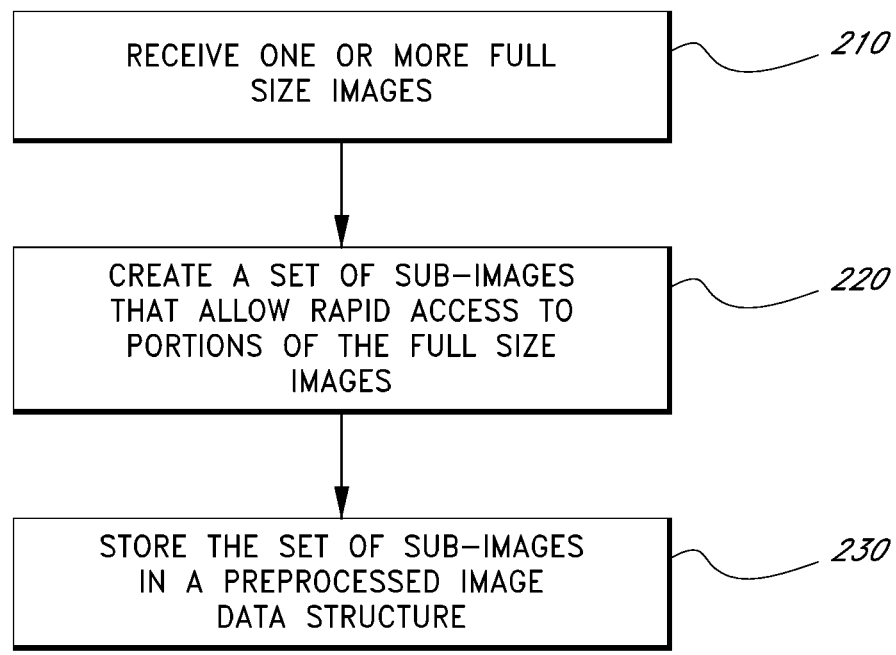
FIG. 2 is a flow chart illustrating an embodiment of a method for displaying an image on an array display.

FIG. 2 is a flowchart illustrating an embodiment of a method of preprocessing images that can provide a high level of interaction and manipulation of the images on tiled display systems. The method illustrated in FIG. 2, as well as the other methods disclosed below, can be stored as process instructions (for example on any type of computer-readable storage medium) accessible by the image processing module 150 and/or other components of the display node 100A, the control node 102, or any other computer or system connected to the array 100 directly or over any type of network. Depending on the embodiment, certain of the blocks described below may be removed, others may be added, and the sequence of the blocks may be altered. The blocks of the methods and algorithms described in connection with the embodiments disclosed herein can be embodied directly in hardware, in a software module executed by a processor, or in a combination of the two.

Beginning in block 210, one or more full size images are received. In some embodiments, the one or more full size images can be sent from the original image data source 164 to display node 100 by way of the control node 102. The full size images can include various types of data for visualization, such as still photographs, videos, or other images of anything including but without limitation, medical, satellite, geosciences, oil, weather monitoring or prediction, astronomy imagery, and include those discussed above with reference to FIG. 1. As those of skill in the art will recognize, the image types can vary greatly and be based on a variety of possible types of data. The term "image," as used herein, in addition to having its ordinary meaning, refers to a graphical or visual representation of any kind of media, including both still and active graphical or visual content or data, such as still image data, streaming data, video data (e.g., movies), content received using screen sender technology, applications windows (e.g., spreadsheet and word processing applications, etc.) and/or the like.

Moving to block 220, a set of sub-images that allow for rapid access to portions of the one or more full size images can be created. In some embodiments, the image processing module 150 preprocesses each original full size image and creates a set of sub-images that are a reduced size version of the original image. These sub-images can also be referred to as "thumbnail" representations of the corresponding full resolution image. Further, the largest sub-image can be the same size as the original image and/or include image content from the original image.

For example, a sub-image can be formed from a cropped portion of the original image, at the same resolution of the original image. Additionally, such sub-images can be stretched to visually appear to cover approximately the same proportion of the corresponding nodes 100A, 100b, 100c, etc, when the entire original image is displayed on the array 100. The stretching may be performed by interpolating pixel values, for instance. These types of manipulation can be performed, for example, on the control node 102. The term "stretch," as used herein, refers to re-sizing the image with or without changing the original aspect ratio. The term "zoom," on the other hand, as used herein, refers to re-sizing the image without changing the original aspect ratio. Such a use of sub-images can help the control node 102, or any computer forming the present method, to operate faster (e.g., redraw the sub-image after it has been moved or stretched) because the control node 102 may not be required to redraw all of the pixels of the original image.

Moving to block 230, the set of sub-images can be stored in a preprocessed image data structure. In some embodiments, each sub-image can be stored in a hierarchical format, such that one or more blocks allow rapid access to a particular part of the image without having to access entire rows or columns. This hierarchical format can allow a display node 100A of the tiled system that knows the portion of an image it needs to display to fetch exactly the level of detail, for example a corresponding sub-image, and/or to quickly fetch the needed blocks that make up the image tile.

Figure 3:
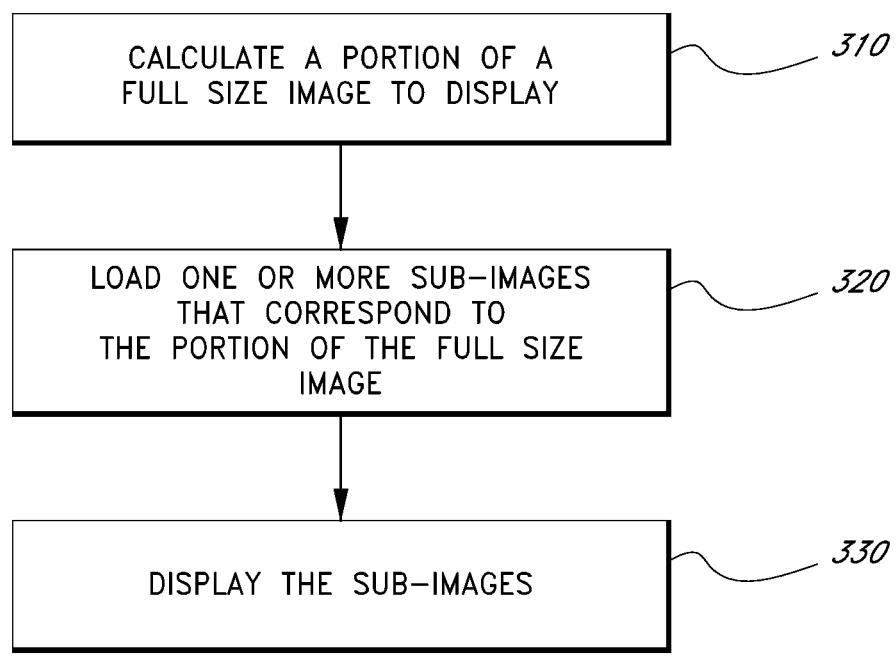
FIG. 3 is a flow chart illustrating another embodiment of a method for displaying an image on an array display.

FIG. 3 schematically illustrates an embodiment of another method of displaying and manipulating images on a tiled display system, such as the array 100. Depending on the embodiment, certain of the blocks described below may be removed, others may be added, and the sequence of the blocks may be altered.

Beginning in block 310, a portion of a full size image to display on a particular display node 100A can be calculated. Additionally, multiple portions of one or more full size images to display on the array 100 can also be calculated. Advantageously, this reduces the amount of data to be loaded on each particular display node 100, as well as a controlling computer, such as the control node 102, and thus increases the responsiveness of the overall tiled display and the control node 102. Because of the increased responsiveness, manipulation of images on the array 100 can be improved.

Moving to block 320, the one or more sub-images that correspond to the portion of the full size image to display are loaded into memory, for example. Because disk access times for loading a large full size image can be impractical, each display node 100A can load blocks of the appropriate sub-images needed for its local portion of the overall tiled display. The correct portions of multiple full size images can also be loaded into memory of the corresponding display node 100A, 100B, 100C, etc.

Moving to block 330, the one or more sub-images can be displayed. In some embodiments, the display node 100A may render the sub-images resident in memory 130 using a multimedia device 140, such as a video card. The rendered sub-images can then be placed on display 166, such as a LCD monitor.

In some embodiments, one or more of the display nodes 100A, 100B, 100C, etc., can be configured to communicate and thereby receive image data directly from a video image source across a network, such as the original image data source 164 across the network 160, which as noted above, can be the Internet or another network, such as any local network.

In some embodiments, the control node 102, which can be considered a "primary workstation", can be configured to establish an initial connection between itself and the tiled display 100 and between itself and the original image data source 164. Additionally, the control node 102 can be configured to facilitate providing connections directly between the original image data source 164 and the tiled display, for example, directly with the display units 100A, 100B, 100C, etc.

FIGS. 4 and 5 schematically depict how an image can be displayed on one or more display units 100A, 100B, 100C, 100D. As depicted in FIG. 4, a video image 410 can be displayed in such a manner that it overlaps two display units 100A and 100C. As further detailed in FIG. 5, if the array 100 is only displaying an image on a limited number of the total number of display units, such as only the units 100A and 100C, then the associated video image data from the source can be selectively sent to those display units 100A and 100C. This can help reduce bandwidth requirements for transmission of image data.

For example, with continued reference to FIGS. 4 and 5, the video image 410, when overlapping two display units, can be broken down into parts corresponding to those portions displayed on different units. As shown in FIG. 5, the image 410 can be segregated into a first portion 411 (displayed on display unit 100) and a second portion 412 (displayed on display unit 100C). As such, in some embodiments, the array 100 can be configured to send the video image data corresponding to the portion 411 to the display unit 100A and the other video image data corresponding to the portion 412 to the display unit 100C, along with data indicating the position at which these portions 411, 412 should be displayed.

As such, all of the video image data corresponding to the entire image 410 does not need to be sent to the other display units. Rather, in some embodiments, the array 100 can be configured to only send video image data to a display unit in the array 100, corresponding to the part of a video image being displayed on that corresponding display unit. This can greatly reduce the magnitude of data flowing into and out of the array 100, and more particularly, each of the display units 100A, 100B, 100C, 100D. Additionally, such selective distribution or routing of data can further aid in reducing the magnitude of data flowing through each of the display units 100N and the associated network can be realized where an image being displayed on the array 100 is updated, such as when monitoring data, videos, etc.

Figure 6:
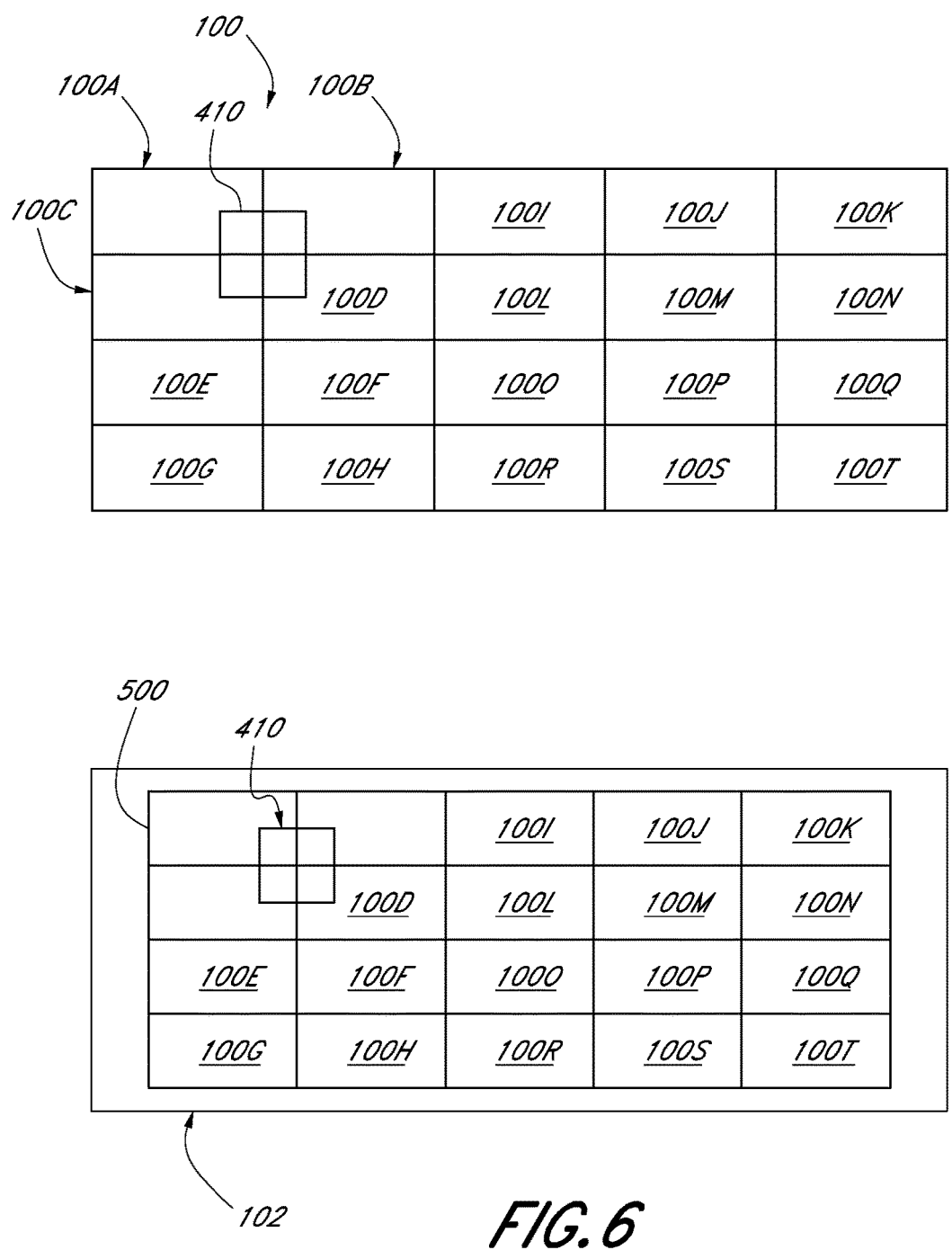
FIG. 6 is a schematic diagram of a tiled display and a control node, the control node including a user interface having a schematic representation of the tiled array including the physical boundaries of each of the display units forming the tiled display.

With reference to FIG. 6, some issues can arise when attempting to control the position of an image, such as the image 410 on the display 100 by way of the control node 102. For example, in some embodiments, the control node 102 can be configured to generate a schematic representation of the display units 100A, 100B, 100C, etc., for use as a graphical user interface. As shown in the lower portion of FIG. 6, the image 410 can be displayed both on the display 100 and the display node 102. The representation of the image 410 on the control node 102 can be in the form of a reduced resolution version of the image 410, a full resolution version, a thumbnail version, or other versions.

In some embodiments, the control node 102 can include a display device, such as a typical commercially available computer monitor. Such computer monitors can have any amount of resolution. However, in some embodiments, the resolution of the display of the control node 102 will be significantly less than the total resolution of the display 100 including all the individual display units 100A, 100B, etc.

Thus, the map 500 schematically representing the display 100 can be drawn to provide an approximation of the proportions of the display 100. For example, if the display 100 provides a total of 19,200 pixels wide by 10,800 high, the display unit of the control node 102 might include $1/10^{th}$ of that resolution, i.e., 1,920 pixels wide by 1,080 pixels high, or other resolutions.

Thus, the display of the control node 102 may be configured to represent only $1/10^{th}$ of the pixels available on the display 100. Thus, if a user attempts to move the image 410 on the control node by only a single pixel to the left or, to the right, up or down, this would translate into a movement of 10 pixels across the display 100. As such, it can be difficult for a user to move an image 410 to precisely the desired position on the display 100, using only the display of the control node 102.

This effect can also make it more difficult to arrange a plurality of images in a way so as to maximize the number of pixels utilized on the display 100 and/or avoid, to the extent possible, having the image 410 overlap the physical boundaries between the individual units 100A, 100B, etc.

Thus, in some embodiments, the array 100 can be configured to automatically adjust positional and/or proportional characteristics of the image 410 to conform to boundaries of the display 100. As used herein, the term "boundaries of the display" can include physical boundaries or logical boundaries. In this context, where the display 100 is formed of a plurality of individual display units: 100A, 100B, etc., which include bezels at the edges of each of the individual displays. The physical boundaries correspond to the edges of the display units. Logical boundaries of the display can include predetermined subdivisions of one (1) or more the individual display units: 100A, 100B, 100C, etc. For example, each of the display units can be subdivided into uniform or non-uniform portions, such as, for example, but without limitation, halves, quarters, eighths, sixteenths, etc.

Thus, in some embodiments, the array 100 can be configured to compare the size of the image 410 relative to the size of grids defined by physical and/or logical boundaries of the array 100 and to provide the user with predetermined functions for moving, stretching or shrinking, with or without preserving the original aspect ratio of the image 410, to a grid defined by physical and/or logical boundaries of the display 100. Such a predetermined function is referred to as a "snapping function" in the description set forth herein.

For example, with reference to FIG. 7, the image 410 is represented on the array 100, positioned slightly to the left of the center on the display unit 100D of the tiled display 100. In the description set forth below of FIGS. 7-52, a reduced sized version of the display 100 is illustrated as having nine (9) display units 100A-100O, solely to simplify the description. It is to be understood that the features, devices, methods, and systems associated with the following description with the associated description of these figures can be applied to any size display, including any size tiled display. The initial position of the image 410 can be the position that the user first places the image 410 on the display 100. This initial position can also be referred to as a "requested position".

As noted above, the display 100 can be configured to allow a user to activate one (1) or a plurality of predetermined functions to change the position and/or size of the image 410, were for due herein, as noted above, as a "snapping function". Such functions can be triggered by any keystroke, button actuation, or combinations thereof, such as, for example, but without limitation, double-clicks, right-clicking, double-right clicking, hot keys assigned to the keyboard, menu selection, touch screen, voice activation, remote control, or automatically when a user resizes or repositions an image on the display 100, or other mouse or keyboard buttons.

In the example illustrated in FIG. 7, upon actuation of the predetermined function, the image 410 is increased in size to conform to one (1) or more boundaries of the next largest grid. In this example, the next largest grid is defined by the physical boundaries of the display node 100D. Thus, the image 410 is moved and stretched such that its upper edge 520, its left edge 522, and its bottom edge 524 are disposed at or close to the physical boundaries of the display unit 100D. In this example, the original aspect ratio of the image 410 is preserved. Thus, the right edge 526 is disposed in accordance with the original aspect ratio of the image 410, resulting from the stretching of the original image 410 until it has the same vertical dimension as the display unit 100D, thereby allowing the three (3) edges, 520, 522, and 524 to conform to the upper, left side and bottom edge of the display unit 100D, respectively.

In some embodiments, the display 100 can be configured to decide whether to shift the image 410 to the left or to the right based upon the position of the center of the image 410. In some embodiments, this decision can be performed by an image manipulator module, described below in greater detail with reference to FIG. 60. In the illustrated example of FIG. 7, the center of the image 410 is slightly to the left of the center of the display unit 100D. In this example, the center of the image 410 can serve as a reference portion of the image 410. Thus, in this embodiment, the display 100 calculates the required enlargement of the image 410 to cause the image 410 to result in a vertical size equal to that of the display unit 100D and additionally repositions the image 410 so that the left edge of the image 522 coincides with the left edge of the display unit 100D.

In some embodiments, the display 100 can be configured to perform the calculations based on the size (for example, in pixels) of the image 410 presently displayed on the display 100 and in comparison to the number of pixels available on the display unit 100D. In other embodiments, the display 100 can be configured to perform the calculations based on the position of the image 410 as represented on the map 500 (FIG. 6, displayed on the control mode 102), or using other techniques.

In the example illustrated in FIGS. 9 and 10, the image 410 is originally placed to the right of the center of display unit 100D. Thus, upon actuation of the snap function, the image 410 is resized such that its upper edge 520, lower edge 524, and right edge 526 conform to the upper, lower, and right edges of the display unit 100D, respectively. Additionally, as noted above, the original aspect ratio of the image 410 of FIG. 9 is preserved in the enlarged and shifted presentation of the image 410 in FIG. 10.

Although the above described examples of FIGS. 7-10 are described in the context of the edges of the individual display units 100D as providing boundaries of a grid, the grids noted above could also be defined by predefined portions of the individual display units 100A, 100B, 100C, etc, including logical boundaries described above.

Figure 11:
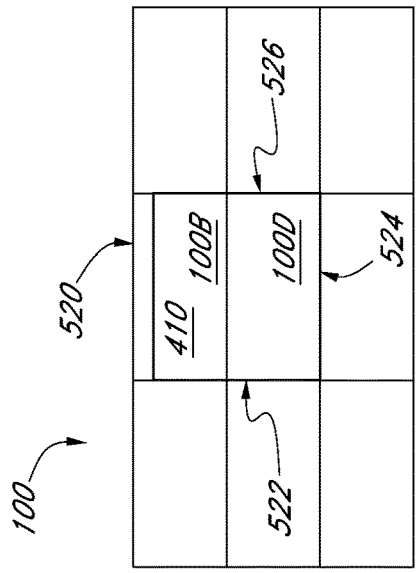
FIG. 11 is a schematic representation of an image represented on a tiled display overlapping a boundary of the tiled display.
Figure 12:
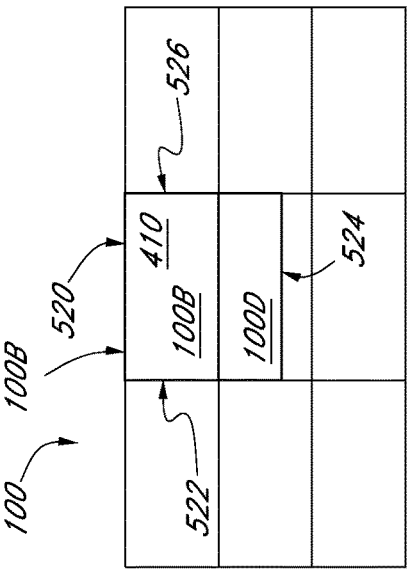
FIG. 12 is a schematic representation of the image of FIG. 11 having been moved and stretched to conform to three boundaries of the tiled display, with the original aspect ratio preserved.

FIGS. 11 and 12 illustrate an example where a user places the original image 410 overlapping display units 100B and 100D. As shown in FIG. 11, the majority of the original image 410 is disposed on display unit 100D. Thus, upon actuation of the snapping function, the image 410 is enlarged, firstly, to fill the entirety of the display unit 100D with the remainder in display unit 100B.

More particularly, the image 410 is enlarged such that its left side edge 522, bottom edge 524 and right edge 526 conform to the left, bottom and right side edges of the display unit 100D. The position of the top edge 520 of image 410 is the result of stretching the image 410, maintaining its original aspect ratio, until the edges 522, 524, 526 conform to the corresponding edges of the display unit 100D, explained above. Similar to the above examples FIGS. 7-10, the display 100 can be configured to determine which of the boundaries shall be used initially to control the resizing of the image 410. Similarly to the above examples, as illustrated in FIG. 11, the majority of the image 410 is disposed on the display unit 100D. Thus, the boundaries of the display unit 100D are used as the initial boundaries for resizing and repositioning the image 410.

Figure 13:
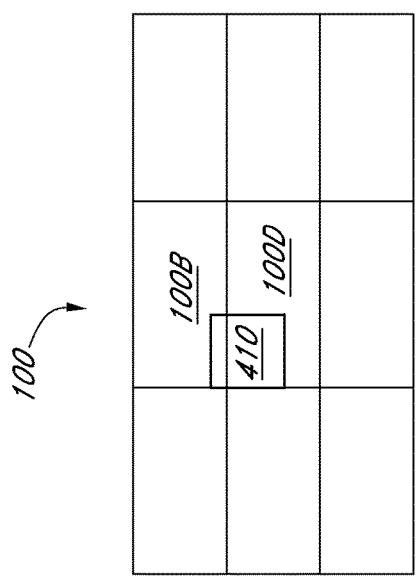
FIG. 13 is another schematic representation of an image represented on a tiled display and overlapping a boundary of the tiled display.
Figure 14:
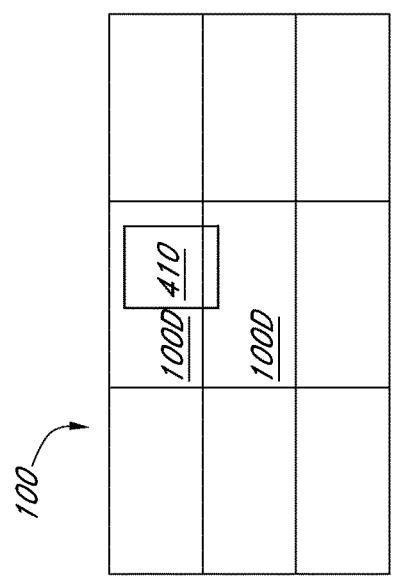
FIG. 14 is a schematic representation of the image from FIG. 13 having been moved and stretched to conform to three (3) boundaries of the tiled display.
Figure 23:
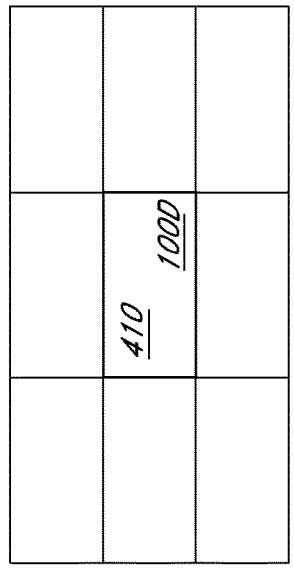
FIG. 23 is a schematic illustration of an image presented on a tiled display which is smaller than one of the display units of the tile display.

In the example illustrated in FIGS. 13 and 14, the original image 410 is placed with a majority thereof on display unit 100B and overlapping partially onto display unit 100D. Thus, when the snap function is actuated, the image 410 is repositioned and stretched so that the top edge 520, left edge 522, and right edge 526 of the image 410 conform to the top, left, and right side edges of the display unit 100B. Additionally, the bottom edge 524 of the image 410 is positioned in accordance with the result of stretching the image 410 to conform to the top, left, and right side edges of the display unit 100B. As noted above, in these examples, the original aspect ratio of the image 410 is preserved.

With reference to FIG. 15, in this example, the image 410 is placed so as to overlap four (4) display units 100A, 100B, 100C, 100D, with the majority of the image 410 overlapping display units 100B and 100D, and with the center of the image 410 close to the boundary between display units 100B, 100D. In this example, as illustrated in FIG. 16, the image 410 is enlarged to fill the full height of the combination of display units 100B and 100D, and is right justified to the right edges of the display units 100B, 100D. As such, the top edge 520 of the image 410 conforms to the top edge of the display unit 100B. The bottom edge 524 of the image 410 conforms to the bottom edge of the display unit 100D and the right edge 526 of the image 410 falls along the right edges of the display units 100B and 100D. In this example, the original aspect ratio of the image 410 is preserved, and thus, the left edge 522 is positioned in accordance with the result of the enlargement of the top, right, and bottom edges, 520, 526, 524 of the image 410 to the top edge of the display unit 100B, the right edges of the display units 100B and 100D, and the bottom edge of the display unit 100D, respectively.

In some embodiments, the display 100 can be configured to automatically stretch in a direction, and in this example, the vertical direction, to fill two (2) grids if the center of the original image 410 is within a predetermined number of pixels of the boundary between the two (2) display units, in this example, 100B and 100D. In other embodiments, the display 100 can be configured to calculate the rows of pixels within a predetermined range of rows of pixels around the center row of the image 410. In some embodiments, the display 100 can be configured to determine if a boundary between two (2) displays, such as the display units 100B, 110, fall within the range of rows of pixels in the center of the image 410. If this determination is true, then the display 100 can be configured to determine that the associated boundaries to be used for stretching the image 410 will be the top of the display 100B and the bottom of the display 100D.

Additionally, the display 100 can be configured to determine which of the left or right edges of the involved display units should be used for justification of the stretched image. In the above example, because the center of the image 410 is disposed on the right side display units 100B, 100D, the right side edge 526, of the image 410 is justified to the right edges of the display units 100B, 100D. However, other techniques can be used for determining in which directions the image 410 is moved and in which directions the image 410 is stretched.

With reference to FIG. 17, in this example, the image 410 is originally placed as overlapping six (6) screens, with the center of the image 410 slightly to the left of the center of the display 100. Thus, in this example, as illustrated in FIG. 18, the image 410 is stretched to fill the full height of three (3) displays in the vertical direction and is left justified, for example, because the center of the image 410 is disposed on the left side of the center of the entire array of the display units. In this example, the original aspect ratio of the image 410 is preserved and thus the right side edge 526 of the image 410 is positioned in accordance with a result of stretching the image 410 such that the top edge 520 conforms to the top edge of the display units 100A, 100B, the bottom edge 524 of the image 410 conform to the bottom edge of the display devices 100E, 100F, and the left side edge 522 of the image 410 conforms to the left side edges of the display devices 100A, 100C and 100E.

Figures 19, 20, 21, 22:
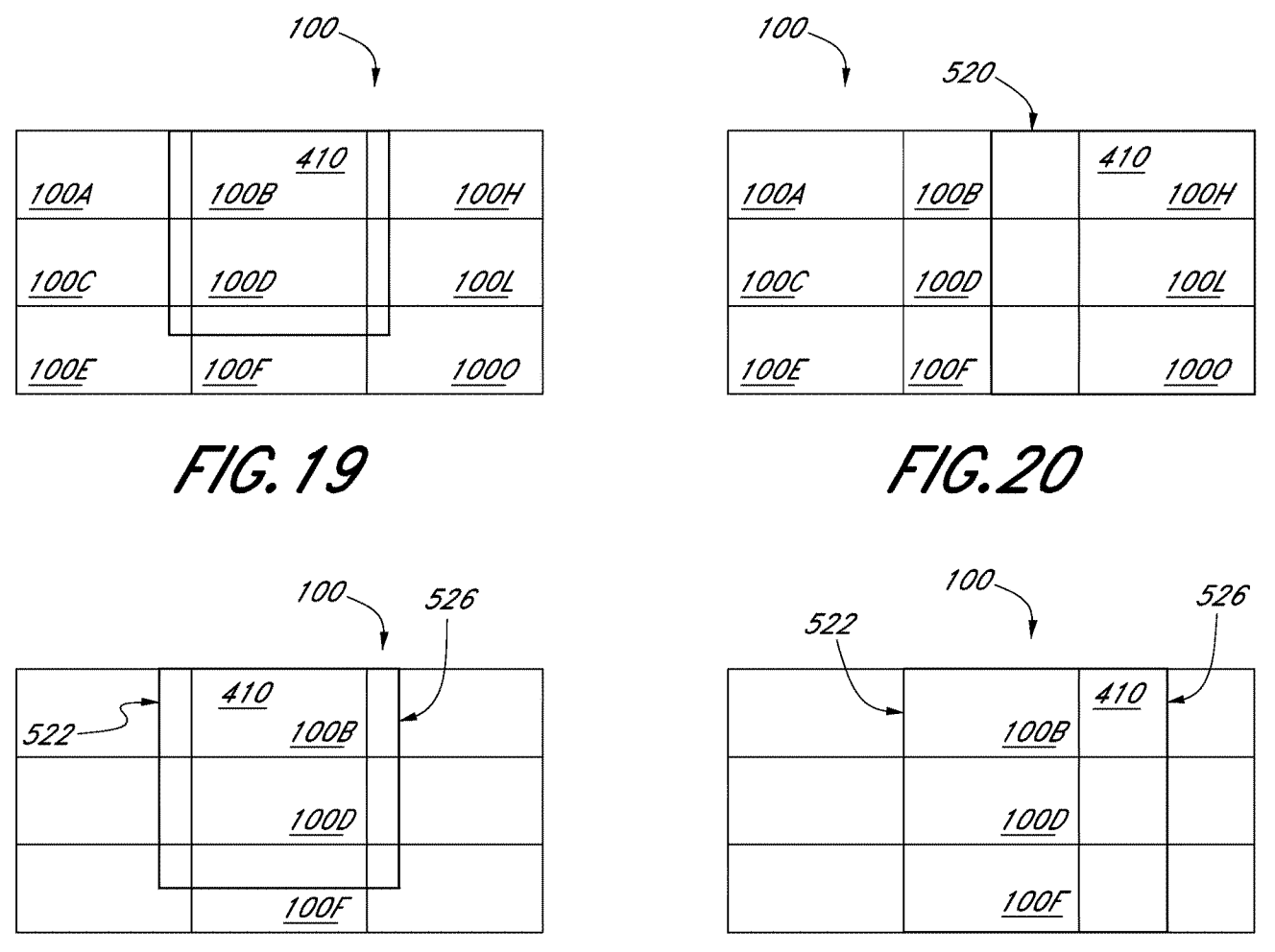

With reference to FIG. 19, in this example, the original image 410 is positioned as overlapping nine (9) of the display units and with the center of the image 410 slightly to the right of the center of the display 100. In this example, as illustrated in FIG. 20, the image 410 is stretched to the full height of three (3) of the display units and is right justified, for example, because the center of the image 410 is slightly to the right of the center of the display 100.

In another example, as illustrated in FIGS. 21 and 22, the original image 410 is positioned in the same arrangement as in FIG. 19, with the center of the image 410 slightly to the right of the center of the display 100 and overlapping nine (9) display units. In this example, the image 410 is stretched to the full height of three (3) display units and because the left edge 522 of the image 410 is closer to the left edge to the display units 100B, 100D and 100F, as compared to the distance between the right edge 526 of the image 410, and the right edges of the display units 100B, 100D, 100F. The image 410 is left justified (FIG. 22), with the left edge of the image 410 conforming to the left edges of the display units 100B, 100D, 100F. Further, in this example, the right edge 526 of the image 410 is positioned in accordance with the result of stretching the image 410 to conform to the top and bottom edges of the display 100 and with the left edge 522 justified to the left edges of the display units 100B, 100D, 100F with the original aspect ratio of the image 410 preserved.

Figure 24:
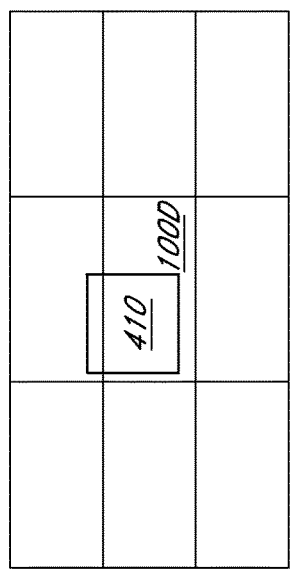
FIG. 24 is a schematic illustration of the image of FIG. 23 having been stretched to conform to a plurality of boundaries of the tile display without the original aspect ratio being preserved.

In some embodiments, a snapping technique can be configured to stretch an image so as to fill physical or logical boundaries or grids, without maintaining the original aspect ratio. For example, in the example of FIGS. 23 and 24, the original image 410 is disposed entirely within the display unit 100D. As shown in FIG. 24, the image 410 is stretched to fill the entire display unit 100D, in both horizontal and vertical directions, to completely fill the display unit 100D, without maintaining the aspect ratio of the original image 410. As such, the image 410 can be stretched in this manner with any known technique.

Figure 25:
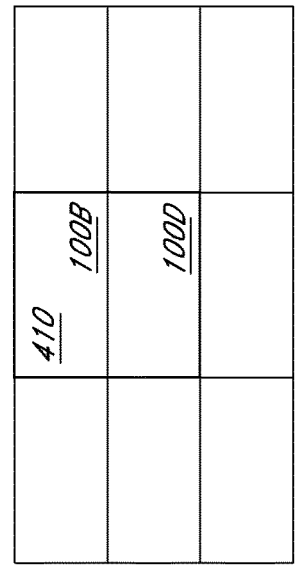
FIG. 25 is a schematic illustration of an image represented on the tiled display and overlapping two (2) units of the tiled display.
Figure 26:
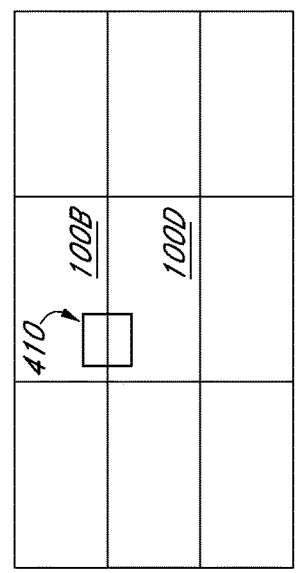
FIG. 26 is a schematic representation of the image of FIG. 25 having been moved and stretched to fill the two display units upon which the image of FIG. 25 originally appeared, without the original aspect ratio being maintained.

In the example in FIGS. 25 and 26, the original image 410 is positioned so as to overlap the display units 100B and 100D. In this example, the image 410 is stretched to completely fill both of the display units 100B and 100D.

Figure 27:
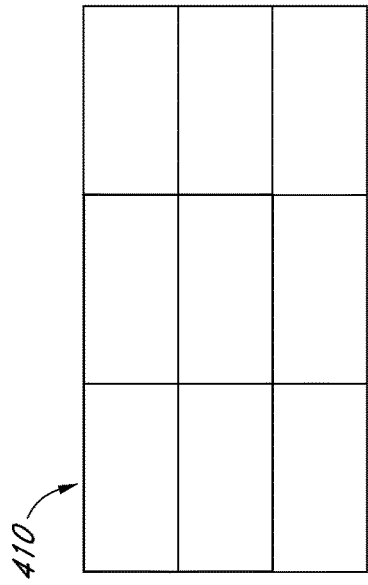
FIG. 27 is a schematic illustration of an image represented on the tile display, overlapping four (4) display units.
Figure 28:
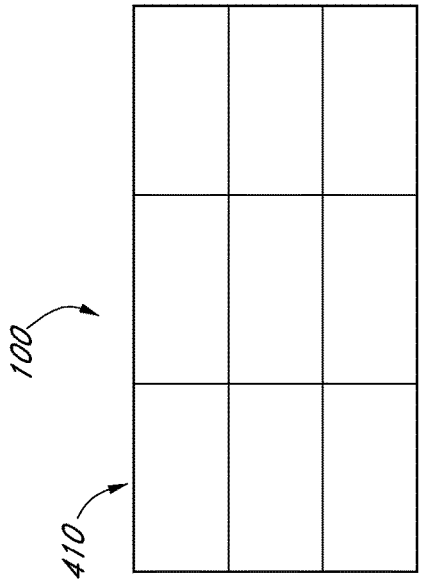
FIG. 28 is a schematic illustration of the image of FIG. 27 having been moved and stretched to fill the four (4) display units, without the original aspect ratio being maintained.

Similarly, in the example of FIGS. 27 and 28, the original image 410 is positioned so as to overlap the display units 100A, 100B, 100C and 100D. In this example, as shown in FIG. 28, the original image 410 is stretched to fill the entirety of display units 100A, 100B, 100C, 100D, regardless of the original aspect ratio of the image 410.

Figure 29:
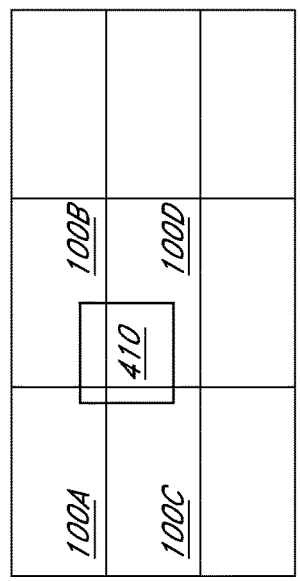
FIG. 29 is a schematic illustration of an image represented on the tiled display and overlapping six (6) units.
Figure 30:
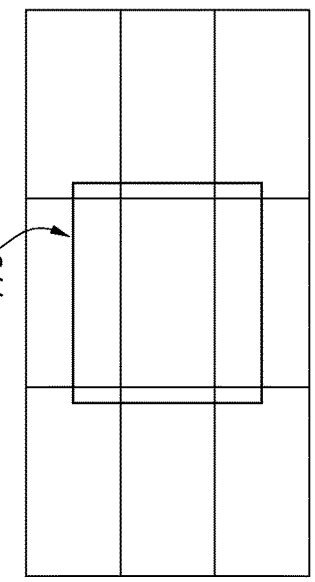
FIG. 30 is a schematic representation of the image of FIG. 29 having been moved and stretched to fill the entirety of all six (6) display units, without the original aspect ratio being maintained.

Further, as shown in the example of FIGS. 29 and 30, the original image 410 is positioned so as to overlap all of the display units of the display 100. In this example, as shown in FIG. 30, the image 410, is stretched to fill the entirety of all the display units of the display 100, regardless of the original aspect ratio of the image 410.

In some embodiments, the display 100 can be configured to determine what grid, which may be made up of physical and/or logical boundaries, is closest to the size and/or position of the original image, and to automatically adjust the positional and/or proportions of the image to conform to the nearest sized grid resulting from the determination, for example, whether the closest grid is smaller or larger than the original image.

Figure 32:
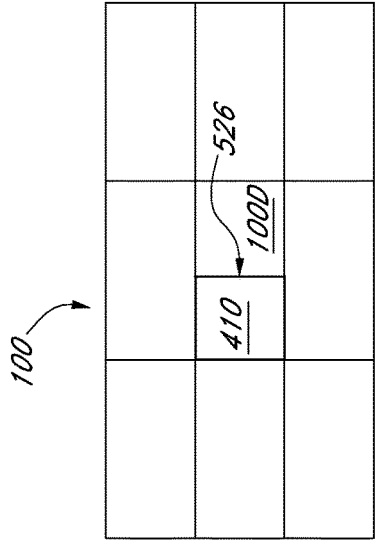
FIG. 32 is a schematic illustration of the image of FIG. 31 having been resized to the closest boundary of the tiled display, with the original aspect ratio being preserved.
Figure 31:
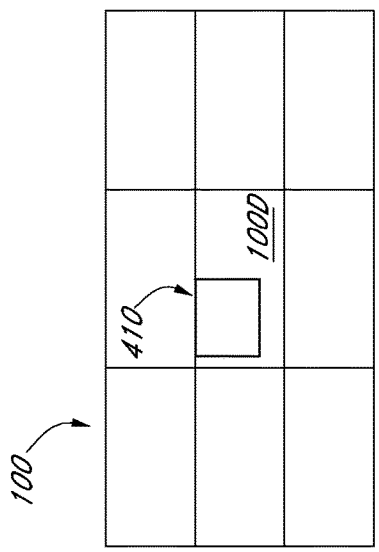
FIG. 31 is a schematic representation of an image displayed on a tiled display.

For example, with reference to the example of FIGS. 31 and 32, the original image 410 is placed within the display unit 100D, slightly to the left of the center of the display unit 100D. In this example, the display 100 is configured to determine which of the edges of the image 410 are closest to any predefined grids that can be defined by physical and/or logical boundaries. In the illustrated example, the closest boundaries are the physical boundaries of the display unit 100D, including its top, left, and bottom edges. Thus, in this example, the image 410 is stretched such that the top edge 520, left edge 522, and bottom edge 524 of the image 410 conform to the top, left, and bottom edges of the display unit 100D. The position of the right edge 526 is the result of the stretching of the image 410 to fill the vertical height and left justify the image 410 within the display 100D while preserving the aspect ratio.

Figure 34:
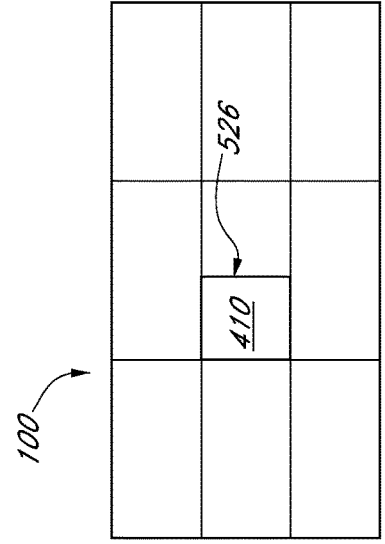
FIG. 34 is a schematic illustration of the image of FIG. 33 having been shrunk to the closest boundary of the tiled display, with the original aspect ratio being preserved.
Figure 33:
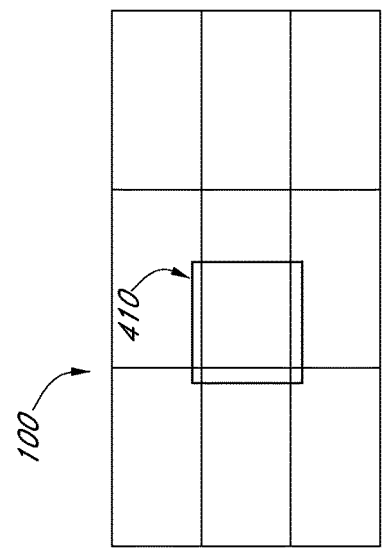
FIG. 33 is a schematic illustration of an image represented on the tiled display and overlapping six (6) units of the tiled display.

In the example of FIGS. 33 and 34, the image 410 is shrunk because the closest grid is defined by the top, left, and bottom edges of the display unit 100D. More specifically, as shown in FIG. 33, the original image 410 is disposed in the display 100 at a position overlapping the display units 100A, 100B, 100C, 100D, 100E, and 100F. However, the top edge 520, left edge 522, and bottom edge 524 of the image 410 are closest to the top, left, and bottom edge of the display unit 100D, than any other physical or logical boundaries in this example. Thus, as shown in FIG. 34, the image 410 is shrunk to fill the vertical height of the display unit 100D and shifted to be left justified within the display unit 100D. The position of the right edge of the image 410 is the same as that described above with to FIG. 32.

Figure 36:
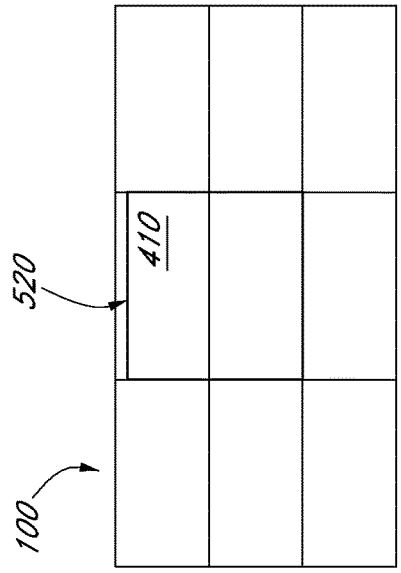
FIG. 36 is a schematic representation of the image of FIG. 35 having been moved and resized to conform to the closest boundary of the tiled display, with the original aspect ratio being preserved.
Figure 35:
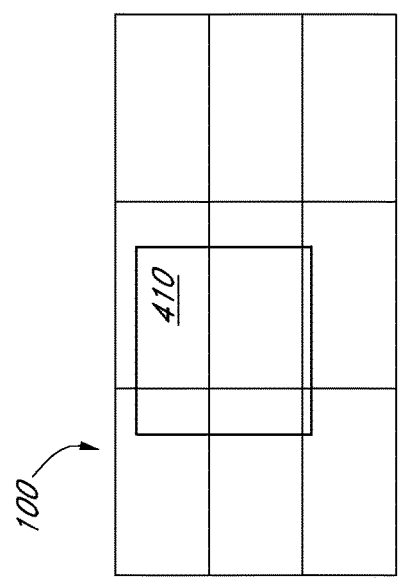
FIG. 35 is a schematic representation of an image represented on the tiled display and overlapping six (6) units of the tiled display.

Similarly, with reference to the example of FIGS. 35 and 36, the original image 410 is disposed so as to overlap the display units 100A, 100B, 100C, 100D, 100E, and 100F. In this example, the left edge 522, the bottom edge 524, and the right edge 526 of the image 410 are closest to the left edges of the display units 100B, 100D, the bottom edge of the display unit 100D and the right edges of the display units 100B, 100D, respectively. Thus, the image 410 is repositioned such that the edges 522, 524, 526, conform to the left edges of the display units 100B, 100D, the bottom edge of the display unit 100B, and the right edges of the display units 100B, 100D. The position of the top edge 520 of the image 410 results from the repositioning and stretching of the image 410 into this position while maintaining the original aspect ratio of the original image 410.

Figure 38:
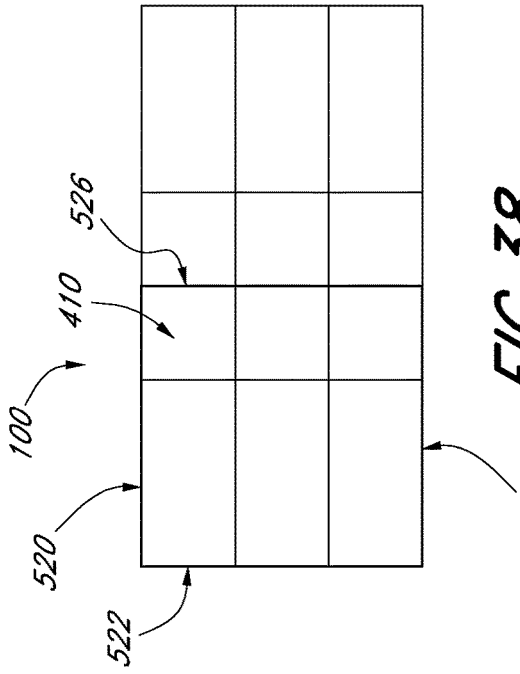
FIG. 38 is a schematic representation of the image of FIG. 37 having been stretched and moved to conform to the closest boundary of the tiled display.
Figure 37:
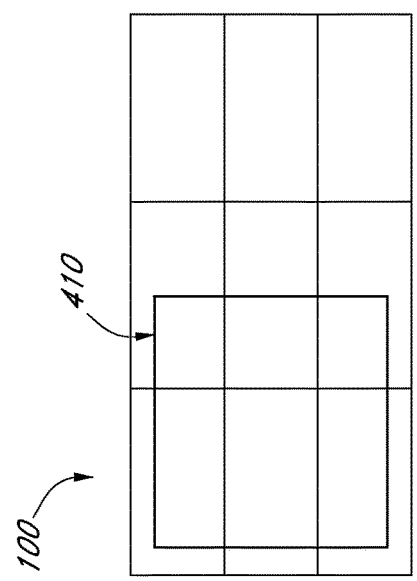
FIG. 37 is a schematic representation of an image represented on a tiled display and overlapping six (6) units of the tiled display.

Similarly, with regard to the example of FIGS. 37 and 38, the original image 410 is positioned on the display 100 overlapping display units 100A, 100B, 100C, 100D, 100E, and 100F. In this example, the top edge 520, left edge 522, and bottom edge 524 are closest to the physical and/or logical boundaries of the display unit 100. In this example, those edges being the top edges of display units 100A, 100B, the left edges of display units 100A, 100C, 100E and the bottom edges of display units 100E, 100F. Thus, as shown in FIG. 38, the image 410 is repositioned and stretched such that the top edge 520 conforms to the top edges of the display units 100A, 100B, the left edge 522 of the image 410 is left justified so as to conform to the left edges of the display units 100A, 100C, 100E and the bottom edge 524 of the image 410 conform to the bottom edges of the display units 100E and 100F. The position of the right edge 526 of the image 410 is a result of the movement and stretching of the image 410 into this position while maintaining its original aspect ratio.

Figure 39:
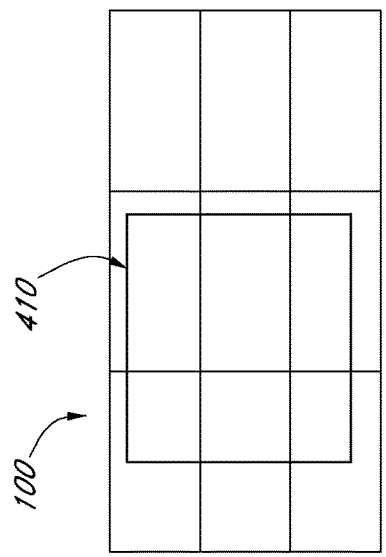
FIG. 39 is a schematic representation of an image represented on the tiled display and overlapping six (6) units of the display.
Figure 40:
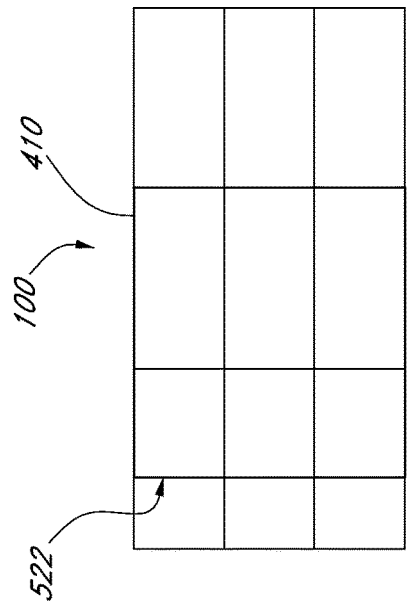
FIG. 40 is a schematic illustration of the image of FIG. 39 having been moved and stretched to the closest boundaries of the tile display, with the original aspect ratio being preserved.

Further, with regard to the example illustrated in FIGS. 39 and 40, the original image 410 is placed so as to overlap the display units 100A, 100B, 100C, 100D, 100E, and 100F. In this example, the top edge 520, right edge 526, and bottom edge 524 of the image 410 are the closest edges to the physical boundaries defined by the top edges of the display units 100A, 100B, the right edges of the display units 100B, 100D, 100F, and the bottom edges of the display units 100E and 100F. As such, the image 410 is shifted and stretched such that the top edge 520, right side edge 526 and bottom edge 524 conform to those physical boundaries. The resulting position of the left edge 522 is the result of the image 410 being stretched to this position and shape while maintaining the original aspect ratio.

In some embodiments, the image 410 can be shifted and/or stretched for conform to the nearest physical or logical boundaries, without regard to its original aspect ratio.

Figure 41:
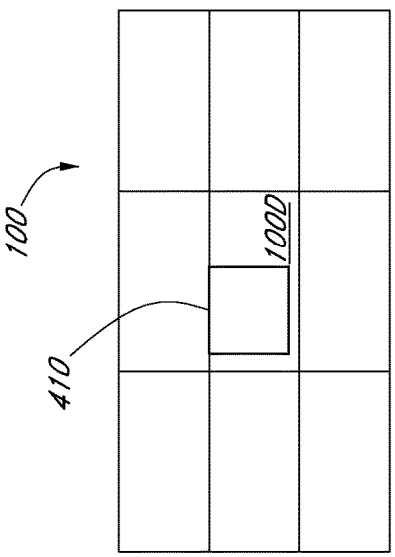
FIG. 41 is a schematic illustration of an image represented on the tiled display and contained within one display unit.
Figure 42:
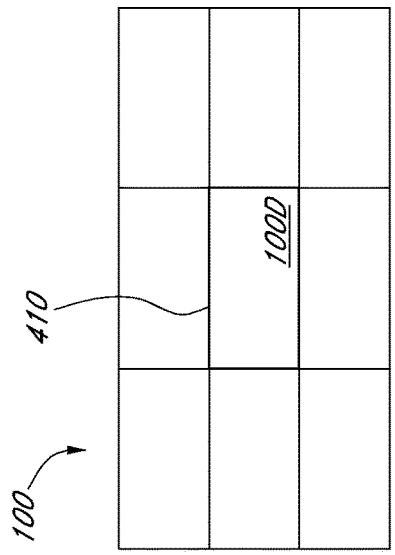
FIG. 42 is a schematic illustration of the image of FIG. 41 having been moved and stretched to fill the closest boundaries of the tiled display without preserving the original aspect ratio.

For example, with regard to the example illustrated in FIGS. 41 and 42, the original image is disposed entirely within the display unit 100D. In this example, the physical and/or logical boundaries of the display 100 that are closest to the edges 520, 522, 524, 526, are the corresponding top, left, bottom and right side edges of the display unit 100D. Thus, as shown in FIG. 42, the image 410 is stretched to fill the entirety of the display unit 100D, without preserving the original aspect ratio of the image 410.

Figure 43:
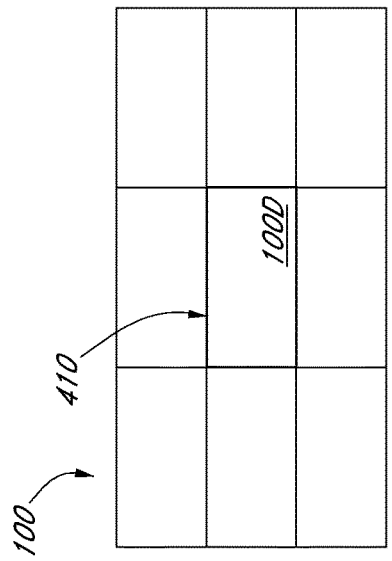
FIG. 43 is a schematic illustration of an image represented on the tiled display and overlapping two (2) display units.
Figure 44:
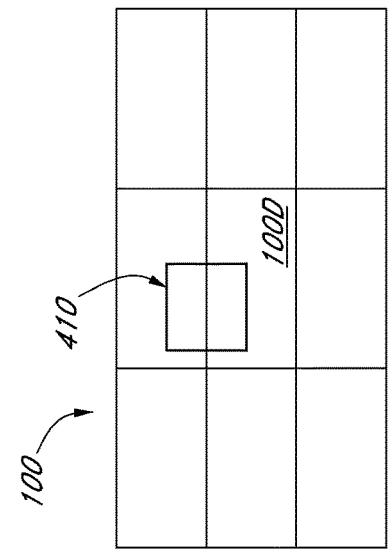
FIG. 44 is a schematic illustration of the image of FIG. 43 having been moved and stretched to fill the closest boundaries of the tiled display, without preserving the original aspect ratio.

As shown in the examples of FIGS. 43, and 44, the original image 410 is disposed in a position overlapping the display units 100B and 100D. However, in this example, as in the example of FIGS. 41 and 42, the physical and/or logical boundaries of the display 100 that are closest to the edges 520, 522, 524, 526 of the original image 410 are also the top, left, bottom and right side edges of the display unit 100D, respectively. Thus, as in the example of FIGS. 41 and 42, the image 410 is stretched to fill the entirety of the display unit 100D, regardless of the original aspect ratio of the image 410.

Figure 45:
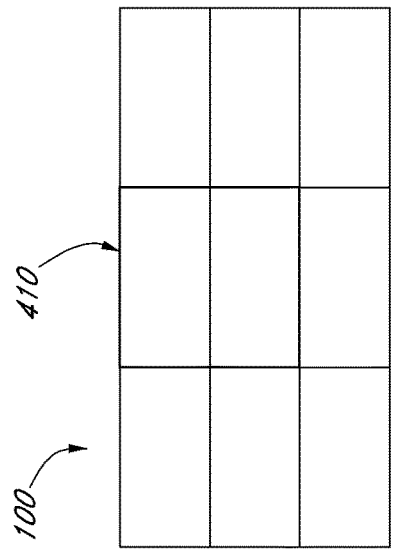
FIG. 45 is a schematic illustration of an image represented on the tiled display and overlapping four (4) display units.
Figure 46:
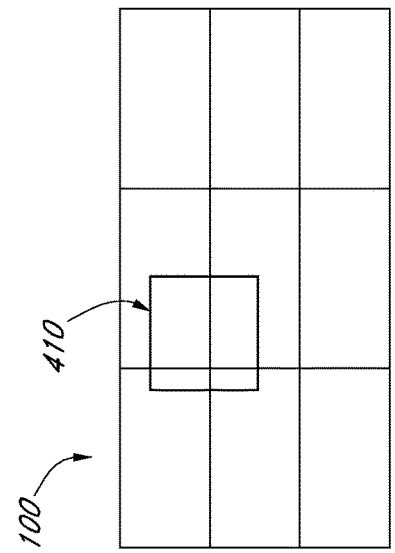
FIG. 46 is a schematic illustration of the image of FIG. 45 having been moved and stretched to fill the closest boundaries of the tiled display.

With regard to the example of FIGS. 45 and 46, the original image 410 is positioned so as to overlap the display units 100A, 100B, 100C, and 100D. In this example, the closest and/or logical boundaries to the edges, 520, 522, 524, 526 of the image 410 are the top edge of the display unit 100B, the left edges of the display units 100B, 100D, the bottom edge of the display unit 100D, and the right edge of the display units 100D and 100B. Thus, as a result of this snapping function, the original image is stretched such that the edges 520, 522, 524, 526 thereof conform to the top edge of the display unit 100B, the left edges of the display units 100B, 100D, the bottom edge of the display unit 100D, and the right edges of the display units 100B, 100D.

Figure 47:
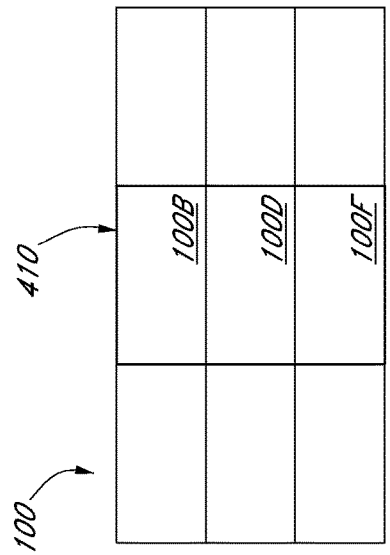
FIG. 47 is a schematic illustration of an image represented on the tiled display and overlapping six (6) display units.
Figure 48:
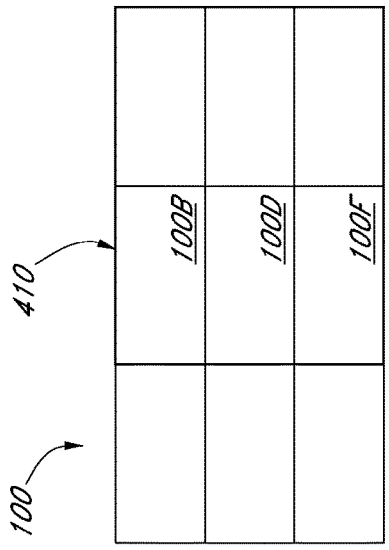
FIG. 48 is a schematic representation of the image of FIG. 47 having been moved and shrunk to fill the closest boundaries of the tiled display.
Figure 50:
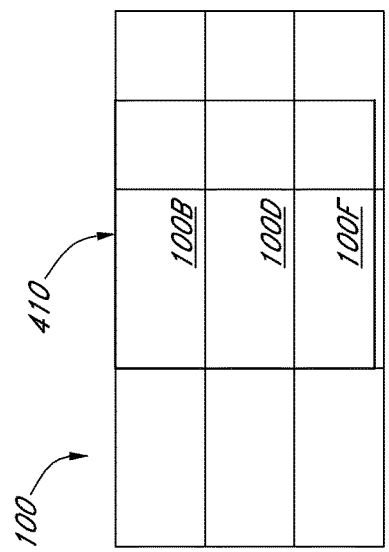
FIG. 50 is a schematic illustration of the image of FIG. 49 having been moved and stretched to fill the closest boundaries of the tiled display, without preserving the original aspect ratio.

In the examples of FIGS. 47 and 48, the original image 410 is positioned so as to overlap all nine (9) of the display units. In this example, the physical and/or logical boundaries of the display 100 which are closest to the top edge 520, left edge 522, bottom edge 524, and right edge 526 of the image 410 are the top edge of the display, the left edges of the display units 100B, 100D, 100F, the bottom edge of the display 100, and the right side edges of the display units 100B, 100D and 100F. Thus, as shown in FIG. 48, the image 410 is stretched in the vertical direction and shrunk in the horizontal direction to conform to these edges.

Figure 49:
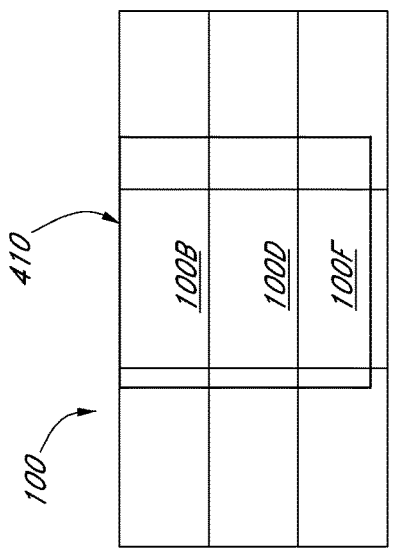
FIG. 49 is a schematic illustration of an image represented on a tile display and overlapping six (6) display units.

In a similar manner, the image 410 of FIG. 49 is stretched such that the edges 520, 522, 524, and 526 of the original image 410 conform to the closest physical and/or logical boundaries, which in this example, are the top edges of the display units 100B, 100I, the right edges of the display units 100B, 100D, 100F, the bottom edges of the display units 100F, 100O, and the right side edges of the display units 100I, 100L and 100O.

Figure 52:
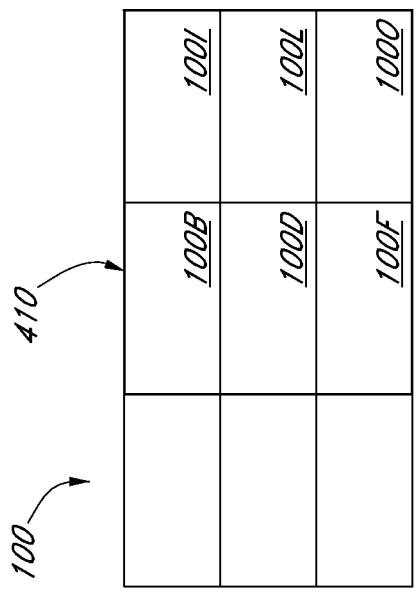
FIG. 52 is a schematic illustration of the image of FIG. 51 having been moved and stretched to fill the closest boundaries of the tiled display, without preserving the original aspect ratio.
Figure 51:
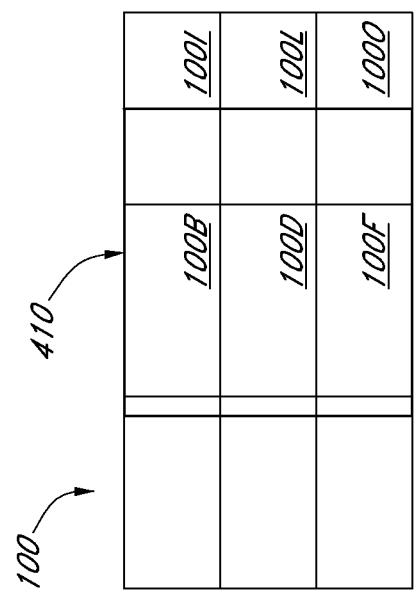
FIG. 51 is a schematic representation of an image represented on a tiled display and overlapping nine (9) display units.

Finally, in the example of FIGS. 51 and 52, the image 410 is originally positioned to fill the full vertical height of the display 100 and with its left edge 522 closest to the left edges of the display units 100B, 100D, and 100I, and with its right edge 526, closest to the right edges of the display units 100I, 100L, 100O. Thus, as shown in FIG. 52, the edges 522 and 526 are moved to those closest boundaries noted above.

In these above embodiments of FIGS. 41 to 52, the determination of how to stretch the original image 410 to conform to the physical and/or logical boundaries can be based on the determination of the distance between each edge of the image 410 and the closest physical and/or logical boundary parallel to that edge. This is because, in these embodiments, the original aspect ratio of the image 410 is not preserved.

In the other embodiments, noted above, where the aspect ratio is preserved, the determination of which boundaries, which physical and/or logical boundaries, should be used to determine the extent to which the images expanded or shrunk, can be based on the closest three (3) edges, leaving the position of the fourth edge to be determined by the result of stretching the image while preserving the original aspect ratio. However, other techniques can also be used.

Additionally, the display 100 can include a user interface to provide adjustability so as to allow the user to chose the techniques for snapping an image to the nearest physical or logical boundaries. For example, such a user interface can allow a user to choose to snap images to the next larger, the next smaller, the closest boundary. Additionally, the user interface can allow a user to choose to stretch to only physical boundaries, only certain logical boundaries such as one-half (½), one quarter (¼), one eighth (⅛), one sixteenth (¹⁄₁₆), etc., or any fraction of one (1) or more display units. Additionally, such a user interface can allow a user to conduct determinations based on the location of the center of the original image. For example, if the center of an original, such as the original image 410 described above disposed toward the left, the right, above, or below, a center of the display or the center a display unit on which a portion of the original image 410 is disposed, the display 100 can use that determination to determine whether the original image should be justified to the left, to the right, to the top, or to the bottom, of the associated display, and/or display unit.

Figure 54:
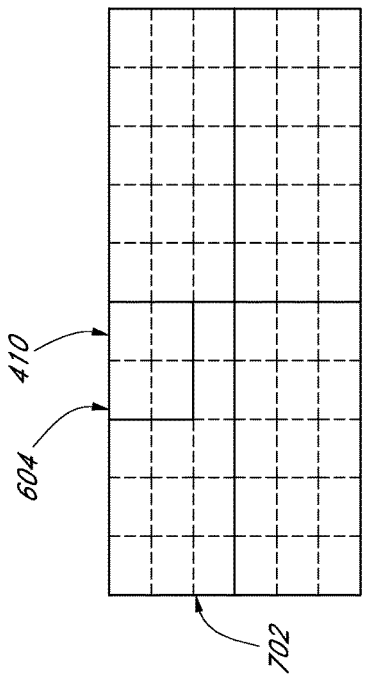
FIG. 54 is a schematic illustration of the image of FIG. 53 having been adjusted to fill a grid defined by logical boundaries.

As illustrated in the examples of FIGS. 52 and 54, the display 100, in this example including display units 100A, 100B, 100C and 100D, includes additional logical boundaries dividing each of the display units in 25 evenly spaced columns and 2½ evenly spaced rows. In each of the display units, the five evenly spaced columns are defined by the left and right physical boundaries of the display unit and for vertical logical boundaries 600, 602, 604, and 606. For purposes of this description, the horizontal logical boundaries are identified by the reference numerals 700, 702, 704, and 706.

Figure 53:
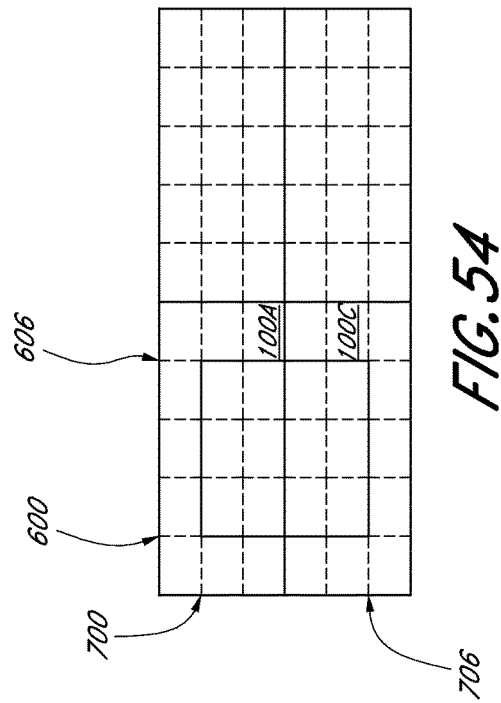
FIG. 53 is a schematic illustration of an image represented on a tiled display having physical and logical boundaries, the image overlapping both physical and logical boundaries.
Figure 55:
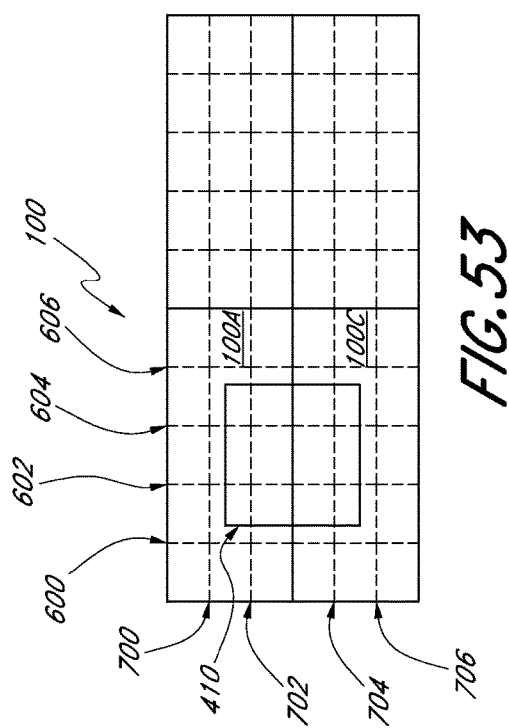
FIG. 55 is a somatic illustration of a tiled display having both physical and logical boundaries and an image overlapping logical boundaries.
Figure 56:
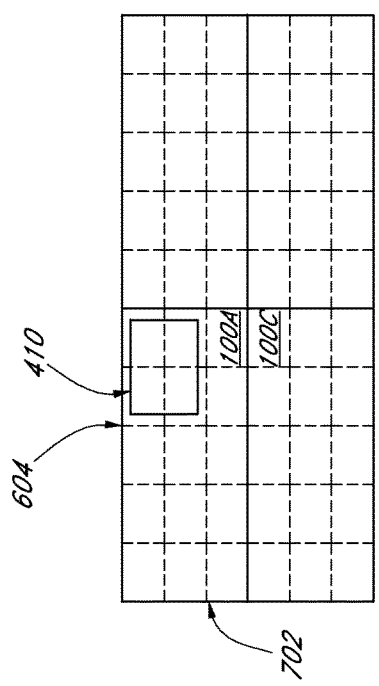
FIG. 56 is a schematic illustration of the image of FIG. 55 having been adjusted to fill a grid defined by both physical and logical boundaries.

As shown in FIG. 53, the original image 410 is placed on the display overlapping the display units 100A and 100C, and within an area defined by the vertical logical boundaries 600 and 606 and the horizontal logical boundaries 700 and 706. Actuation of the snapping function, in this example, as illustrated in FIG. 54, causes the image 410 to be stretched to fill the grid defined by the vertical logical boundaries 600 and 606 and the horizontal logical boundaries 700 and 706. In this example, the original aspect ratio is not preserved. Paragraph additionally, as noted above, a "grid" can be defined by a combination of physical and logical boundaries. As shown in the example of FIG. 55, the original image 410 is disposed entirely within the display unit 100A and within a grid defined by the upper edge of the display unit 100A, the horizontal logical boundary 702, the right edge of the display unit 100A and the vertical logical boundary 604. Upon actuation of the snapping function, as illustrated in FIG. 56, the image 410 is stretched to fill the grid defined as noted above.

In the description set forth above, it is disclosed that the display 100 can be configured to perform the snapping functions described above. In this context, it is to be understood that this phrase is intended to mean that the display 100, the control mode 102, or any other computer or workstation or processor communicating with the display 100 can include one or more modules, control routines, or software, designed to perform these functions.

Figure 57:
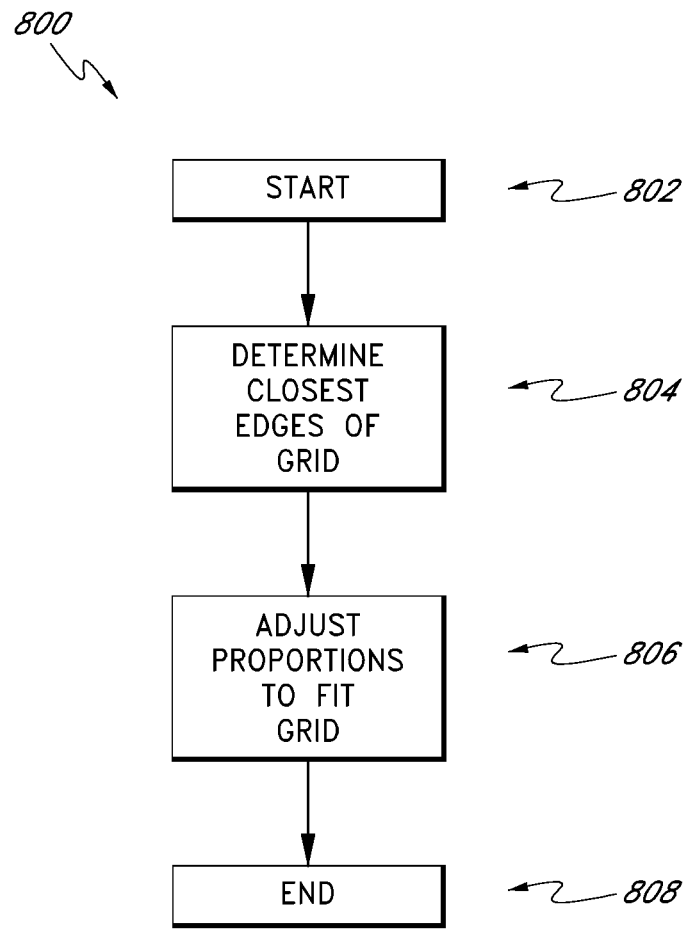
FIG. 57 is a block diagram illustrating a control routine that can be used with the system illustrated in FIG. 1 to provide snapping functions.

FIG. 57 illustrates a control routine 800, which can be stored or contained in any of the above noted locations, for providing at least some of the functionalities described above. As shown in FIG. 57, the control routine 800 can begin with an operation block 802. The control routine 800 can be caused to begin by any predetermined input from a user, such as those noted above as optional ways in which the snapping function can be triggered. After the control routine 800 begins at operation block 802, the control routine 800 can move to operation block 804.

In operation block 804, the edges of a grid closest to the edges of the original image can be determined. For example, with regard to any of the above described examples in FIGS. 7-55, a calculation can be performed to determine the distance between the top, bottom, left, and right edges of the image 410 to all of the physical and/or logical boundaries defined in the display 100. Optionally, as noted above, a user can also choose to perform the snapping functions with regard to only physical boundaries, only logical boundaries, or any combination of both physical and logical boundaries. And thus, the procedures of operation block 804 can be performed with reference to only physical boundaries, only logical boundaries, or both physical and logical boundaries, in accordance with the user's choice. After it is determined which of the physical and/or logical boundaries are closest to the edges of the original image 410, the control routine 800 can move to operation block 806.

In the operation block 806, the image 410 can be adjusted to fit the grid defined by the physical and/or logical boundaries that are closest to the edges of the original image 410. As noted above, if the original aspect ratio of the original image 410 is not to be preserved, the original image 410 can be shifted in position and/or stretched or shrunk to fit the grid defined above. After the operation block 806, the control routine 800 can end at operation block 808.

Figure 58:
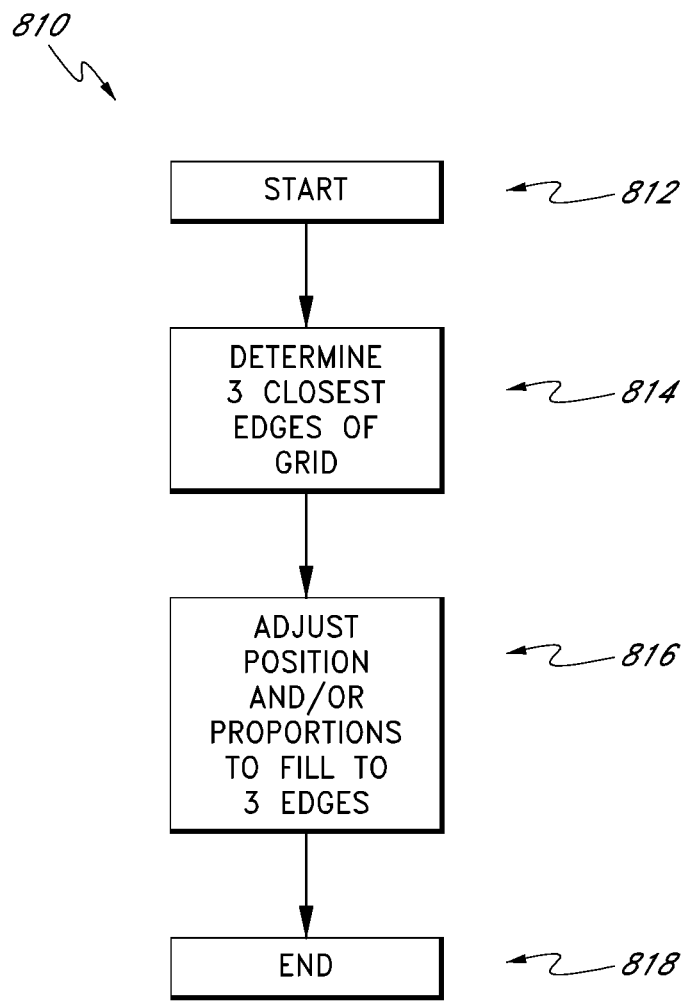
FIG. 58 is a block diagram illustrating a control routine that can be used with the system of FIG. 1 to provide snapping functions.

FIG. 58 illustrates a control routine 810 that can be used to provide additional functions described above with regard to the snapping function. For example, as shown in FIG. 58, the control routine 810 can begin with operation block 812. The operation block 812 can be performed in accordance with the description of operation block 802 described above with reference to FIG. 57. After the operation block 812, the control routine 810 moves to operation block 814.

In the operation block 814, it can be determined which 3 physical and/or logical boundaries of the display 100 are closest to the edges of the original image 410. For example, with reference to FIG. 7, the result of this determination of operation block 814 would find that the top, left, and bottom edges of the display unit 100D are the closest to the top, left, and bottom edges 520, 522, 524 of the image 410, respectively. After the operation block 814, the control routine 810 and moved to operation block 816.

With continued reference to FIG. 58, in the operation block 816, the position and/or proportions of the original image can be adjusted to fill the image to the closest three edges identified in operation block 814. For example, as described above with reference to the examples of FIGS. 7 and 8, the image 410 is stretched such that the top, left, and bottom edges 520, 522, and 524 of the original image 410 conform to the top, left, and bottom edges of the display unit 100D, respectively. Additionally, the position of the right edge 526 of the image 410 is a result of the above noted stretching of the original image 410, while preserving the original aspect ratio. After the operation block 816, the control routine 810 can move to operation block 818 and end.

Figure 59:
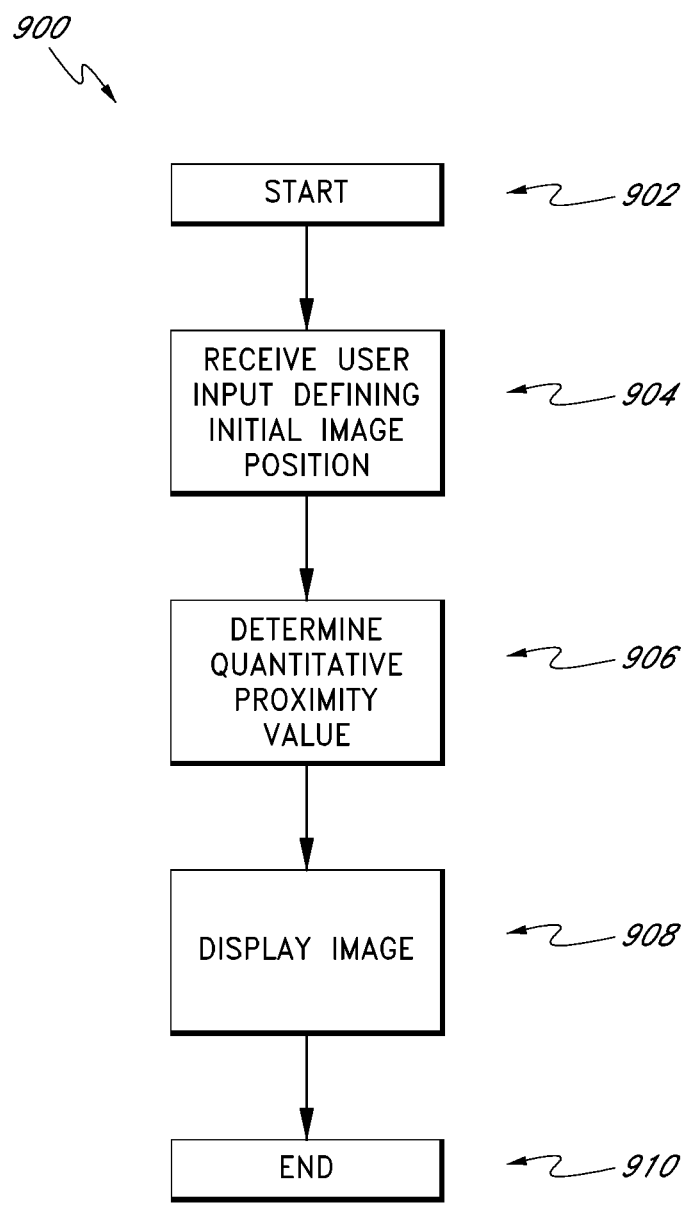
FIG. 59 is a block diagram illustrating a control routine that can be used with the system of FIG. 1 to provide snapping functions.

FIG. 59 illustrates an embodiment of a control routine 900 that can be executed to position an image on an arrayed display system (e.g., tiled display system 100) including at least two discrete display devices. In some embodiments, the control routine 900 can be used to provide at least some of the snapping functions described above. In one implementation, the control routine 900 is performed by any of the nodes (e.g., control node 102 and/or any of display nodes 100A-100N) of the tiled display system 100. In general, the control routine 900 can be performed by any processor or processors. The control routine can begin with operation block 902. In some embodiments, the control routine 900 begins with the detection of a user input.

In operation block 904, input from a user is received through one or more user input devices (e.g., mouse, keyboard, button, track ball, touch screen, microphone, remote control, and/or the like). The user input defines an initial image position of an image on the array in an orientation overlapping at least two of the discrete display devices of the arrayed display system. Upon receipt of the user input in operation block 904, the control routine 900 can move to operation block 906.

In operation block 906, a quantitative proximity value representing a proximity of at least a reference portion of the image and a reference portion of at least one of the discrete display devices can be determined. The reference portion of the image can be the center position of the image or any of the boundaries of the image. The reference portion of the discrete display devices can be the center position of the individual discrete display devices or any of the boundaries of the discrete display devices. For example, with regard to any of the above-described examples in FIGS. 7-55, a calculation can be performed to determine the distance between the top, bottom, left, and/or right edges of the image 410 to all of the physical and/or logical boundaries defined in the display 100. Optionally, as noted above, a user can also choose to perform the snapping functions with regard to only physical boundaries, only logical boundaries, or any combination of both physical and logical boundaries. And thus, the procedures of operation block 906 can be performed with reference to only physical boundaries, only logical boundaries, or both physical and logical boundaries, in accordance with the user's choice. Multiple quantitative proximity values can be determined at operation block 906. After one or more quantitative proximity values are determined in operation block 906, the control routine 900 can move to operation block 908.

In operation block 908, an image can be displayed in a predetermined position that is different than the initial position based on the one or more quantitative proximity values determined at operation block 906. In some embodiments, the initial position of the image is defined by a position of the reference portion (e.g., a center point of the image) and a stretch value of the image. At operation block 908, the image can be displayed by altering at least one of the position of the reference portion and the stretch value of the image. Thus, the initial image can be modified to be displayed according to the snapping functions described with respect to FIGS. 7-55. After the operation block 908, the control routine 900 can move to operation block 910 and end.

FIG. 60 is a schematic diagram illustrating embodiments of an image manipulator stored on a computer readable medium 100O. The computer readable medium 100O includes modules that can be executed by any of the nodes 100A-100N, 102 of the tiled display system 100 of FIG. 1 to cause one or more nodes to control the display of images on the tiled display system 100. In some embodiments, the image manipulator is configured to automatically resize and/or reposition content (e.g., an image) on the tiled display system 100 so that the content aligns, or "snaps" to, one or more physical or logical boundaries of the discrete display devices of the tiled display system 100. For example, the image manipulator can center the content in a predetermined space or shift the content to one or more edges of the predetermined space based on the position of the content prior to the manipulation, as described above.

As shown in FIG. 60, the image manipulator stored on the computer-readable medium can include an image control module 1010, a user interface module 1020, a relative position determination module 1030, and a position shift module 1040. The user interface module 1020 can be included as a sub-module of the image control module 1010, as shown in FIG. 60, or it can be a standalone module. In some embodiments, the modules are executed by the control node 102. In general, the modules can be executed by one or more processors within one or more control modules or mechanisms. For example, in some embodiments, a control module or mechanism can be embedded within the arrayed display with touch surface control or gesture-based cameras or sensors.

In some embodiments, the image control module 1010 controls the size and location of an image displayed on an array of discrete display devices. The control can be based on manual user input or can be performed automatically based on a pre-configured default. The user interface module 1020, upon execution, can receive an image position request from a user identifying a requested position and/or size of an image on the array via a user input device.

In some embodiments, the relative position determination module 1030 determines one or more quantitative proximity values representing a proximity of one or more reference portions of the image in a position on the arrayed display system corresponding to the requested position and one or more reference portions of at least one of the discrete display devices of the arrayed display system. In some embodiments, the proximity values comprise distances between reference points, such as center points and/or boundaries. The proximity values can be determined, for example, as described above with respect to operation block 906 of FIG. 59, and throughout the description.

The position shift module 1040 can, upon execution, shift the position and/or adjust the size of the image on the arrayed display away from the requested position and toward a predetermined position based on the one or more quantitative proximity values determined by the relative position determination module 1030. In some embodiments, the position shift module 1040 positions the image on the arrayed display away from the requested position of the image toward one of a plurality of predetermined positions based on the quantitative proximity value determined by the relative position determination module 1030. In some embodiments, the shift position module 1040 can display the image on the arrayed display as described with respect to operation block 908 of FIG. 59 and/or as described with respect to the displays 100 of FIGS. 7-55. For example, the image can be centered within one or more discrete display devices, snapped to physical or logical boundaries of the discrete display devices, or otherwise shifted, and/or can be resized based at least in part on the one or more quantitative proximity values. In general, the position shift module 1040 is configured to adapt at least one of the dimensional and positional parameters of an image to conform to at least one of a physical or logical boundary associated with the tiled display. The displayed image can cover an entire display device, multiple display devices, fractional portions of a display device, and/or combinations of whole and fractional portions of display devices.

In addition the types of connections and couplings discussed above, any coupling or connection discussed herein could be a local area network, wireless local area network, wide area network, metropolitan area network, storage area network, system area network, server area network, small area network, campus area network, controller area network, cluster area network, personal area network, desk area network or any other type of network.

Any of the computers, laptops, server, including the proxy server, control nodes, workstation, or other devices herein may be any type of computer system. A computer system may include a bus or other communication mechanism for communicating information, and a processor coupled with bus for processing information. Computer system may also includes a main memory, such as a random access memory (RAM), flash memory, or other dynamic storage device, coupled to bus for storing information and instructions to be executed by processor. Main memory also may be used for storing temporary variables or other intermediate information during execution of instructions to be executed by processor. Computer system may further include a read only memory (ROM) or other static storage device coupled to a bus for storing static information and instructions for processor. A storage device, such as a magnetic disk, flash memory or optical disk, may be provided and coupled to bus for storing information and instructions.

The embodiments herein are related to the use of computer system for the techniques and functions described herein in a network system. In some embodiments, such techniques and functions are provided by a computer system in response to processor executing one or more sequences of one or more instructions contained in main memory. Such instructions may be read into main memory from another computer-readable storage medium, such as storage device. Execution of the sequences of instructions contained in main memory may cause a processor to perform the process steps described herein. In alternative embodiments, hard-wired circuitry may be used in place of or in combination with software instructions to implement embodiments. Thus, embodiments are not limited to any specific combination of hardware circuitry and software.

The term "computer-readable storage medium" as used herein, in addition to having its ordinary meaning, refers to any medium that participates in providing instructions to a processor for execution. Such a medium may take many forms, including but not limited to, non-volatile media and volatile media. Non-volatile media includes, for example, optical or magnetic disks, such as a storage device. Volatile media includes dynamic memory, such as main memory. Transmission media includes coaxial cables, copper wire and fiber optics, including the wires that comprise a bus.

Common forms of computer-readable media include, for example, a floppy disk, a flexible disk, hard disk, magnetic tape, or any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge.

Computer systems can send messages and receive data, including program code, through the networks or other couplings. The received code may be executed by a processor as it is received, and/or stored in storage device, or other non-volatile storage for later execution.

In general, the word "module," as used herein, refers to logic embodied in hardware or firmware, or to a collection of software instructions, possibly having entry and exit points, written in a programming language, such as, for example, Java, Lua, Objective-C, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware, or combinations of software, hardware and/or firmware. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure. Generally, the modules described herein refer to logical modules that may be combined with other modules or divided into sub-modules despite their physical organization or storage.

Each of the processes, components, and algorithms described above can be embodied in, and fully automated by, modules executed by one or more computers or computer processors. The modules can be stored on any type of computer-readable medium or computer storage device. The processes and algorithms can also be implemented partially or wholly in application-specific circuitry. The results of the disclosed processes and process steps can be stored, persistently or otherwise, in any type of computer storage. In addition, the modules can comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, variables, or the like.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Although the foregoing description includes certain embodiments, other embodiments will be apparent to those of ordinary skill in the art from the disclosure herein. Moreover, the described embodiments have been presented by way of example only, and are not intended to limit the scope of the inventions. Indeed, the novel methods and systems described herein may be embodied in a variety of other forms without departing from the spirit thereof. Accordingly, other combinations, omissions, substitutions and modifications will be apparent to the skilled artisan in view of the disclosure herein. Thus, the present inventions are not intended to be limited by the disclosed embodiments.

What is claimed is:

1. A display system including at least one discrete display device, the system comprising:
   at least one discrete display device;
   a control module configured to allow a user to move a graphical representation of an image to a plurality of positions on the at least one discrete display device to thereby define a requested position;
   the control module being further configured to determine a difference between a first distance and a second distance, wherein the first distance extends from a first boundary of the image in the requested position to a first boundary of the image in a first predetermined position of a plurality of predetermined positions on the at least one discrete display device, and wherein the second distance extends from a second boundary of the image in the requested position to a second boundary of the image in a second predetermined position of the plurality of predetermined positions;
   the control module being further configured to at least one of move and stretch the image toward one of the first predetermined position or the second predetermined position based on the determined difference.

2. The system according to claim 1, wherein the first and second predetermined positions each include fractional portions of the at least one discrete display device.

3. The system according to claim 1, wherein the at least one discrete display device comprises a first discrete display device and at least a second discrete display device disposed adjacent to the first discrete display device, and wherein the first and second predetermined positions each include fractional portions of one of the first and second discrete display devices.

4. The system according to claim 3, wherein at least one of the first or second predetermined positions includes one position comprising fractional portions of both of the first and second discrete display devices.

5. The system according to claim 1, wherein the first boundary of the image in the first predetermined position is a top, bottom, left, or right boundary of the least one discrete display device.

6. The system according to claim 1, wherein the requested position is defined by a position of a reference portion of the image on the at least one discrete display device and a stretch value of the image.

7. The system according to claim 6, wherein the control module is configured to alter at least one of the position of the reference portion and the stretch value of the image.

8. The system according to claim 3, wherein the control module is connected to the first and second display devices, the control module comprising a processor and a third display device, the control module being configured to display a representation of an array of discrete display devices and the graphical representation of the image.

9. The system according to claim 1, wherein at least one of the at least one discrete display devices comprises the control module.

10. A method of positioning an image on an arrayed display system including a plurality of discrete display devices disposed adjacent one another, the method comprising:
   receiving an input from a user defining an initial image position of the image on the arrayed display system in an orientation overlapping at least two discrete display devices in the plurality of discrete display devices;
   determining at least a first and a second quantitative proximity values, wherein the first quantitative proximity value represents a first distance that extends from a first boundary of the image in the initial position to a first boundary of the image in a first predetermined position of a plurality of predetermined positions on at least one of the two discrete display devices, and wherein the second quantitative proximity value represents a second distance from a second boundary of the image in the initial image position to a second boundary of the image in a second predetermined position of the plurality of predetermined positions;

determining a difference between the first quantitative proximity value and the second quantitative proximity value; and displaying the image in one of the first predetermined position or the second predetermined position based on the determined difference, wherein the first and second predetermined positions are different than a position corresponding to the initial image position.

11. The method according to claim 10, wherein the step of displaying comprises displaying the image in one of the plurality of predetermined positions which include fractional portions of the at least two discrete display devices.

12. The method according to claim 10, wherein the step of displaying comprises displaying the image in one of the plurality of predetermined positions which include fractional portions of one of the at least two discrete display devices.

13. The method according to claim 10, wherein the step of displaying comprises displaying the image in one of the plurality of predetermined positions which includes one position comprising fractional portions of both of the at least two discrete display devices.

14. The method according to claim 10, wherein the first boundary of the image in the first predetermined position is a top, bottom, left, or right boundary of one of the at least two discrete display devices.

* * * * *

UNITED STATES PATENT AND TRADEMARK OFFICE
CERTIFICATE OF CORRECTION

PATENT NO. : 9,606,764 B2  
APPLICATION NO. : 14/635285  
DATED : March 28, 2017  
INVENTOR(S) : Stephen F. Jenks Page 1 of 1

It is certified that error appears in the above-identified patent and that said Letters Patent is hereby corrected as shown below:

In the Specification

In Column 24, Line 46, change "100O." to --1000.--.

In Column 24, Line 46, change "100O" to --1000--.

In the Claims

In Column 28, Line 59, in Claim 10, after "initial" insert --image--.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*